(12) United States Patent
Leigh et al.

(10) Patent No.: US 11,150,430 B1
(45) Date of Patent: Oct. 19, 2021

(54) FIST-BUMP OPTICAL CONNECTOR BLINDMATING AMONG MULTIPLE ENCLOSURES IN A RACK

(71) Applicant: HEWLETT PACKARD ENTERPRISE DEVELOPMENT LP, Houston, TX (US)

(72) Inventors: Kevin B. Leigh, Houston, TX (US); Everett R. Salinas, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/911,366

(22) Filed: Jun. 24, 2020

(51) Int. Cl.
*G02B 6/00* (2006.01)
*G02B 6/44* (2006.01)
*G02B 6/38* (2006.01)
*G02B 6/42* (2006.01)

(52) U.S. Cl.
CPC ......... *G02B 6/4452* (2013.01); *G02B 6/3878* (2013.01); *G02B 6/4261* (2013.01); *G02B 6/4292* (2013.01)

(58) Field of Classification Search
CPC .. G02B 6/4452; G02B 6/3878; G02B 6/4292; G02B 6/4261; G02B 6/00
See application file for complete search history.

(56) References Cited

U.S. PATENT DOCUMENTS

| 4,699,455 | A | 10/1987 | Erbe et al. |
| 7,209,358 | B2 | 4/2007 | Garnett et al. |
| 8,939,792 | B2 | 1/2015 | Takeuchi et al. |
| 8,977,088 | B2* | 3/2015 | Castagna ............. G02B 6/4206 385/49 |
| 8,985,865 | B2* | 3/2015 | Howard ............... G02B 6/4212 385/79 |
| 9,052,478 | B2* | 6/2015 | Charbonneau-Lefort .................... G02B 6/32 |
| 9,140,862 | B2 | 9/2015 | McColloch |

(Continued)

OTHER PUBLICATIONS

AFL Global; "Poli-MOD® Patch and Splice Module"; Accessed Dec. 27, 2019 <https://www.aflglobal.com/Products/Fiber-Optic-Connectivity/Modules-and-Panel-Accessories/Poli-MOD-Patch-and-Splice-Module.aspx>; 2 pgs.

(Continued)

*Primary Examiner* — Jennifer Doan
(74) *Attorney, Agent, or Firm* — Sheppard Mullin Richter & Hampton LLP

(57) ABSTRACT

A system is provided for connecting a plurality of different enclosures within rack. Enclosures can be stacked and contain a plurality of articulating arm assemblies configured to mate with each other. Each articulating arm assembling may comprise a side plenum, arm plenum, plenum pivot, and at least one knuckle housing. One or more knuckle housings of each articulating arm assembly configured to connect with one or more knuckle housing of a different articulating arm assembly. Each articulating arm assembly configured to move to at least a open and an closed position. Each knuckle housing of each articulating arm assembly includes a plurality of optical connector arrays configured to mate with corresponding optical connector arrays of a different articulating arm assembly. Each knuckle housing may further include at least one retention feature configured to retain coupling of a knuckle housing with a corresponding knuckle housing.

20 Claims, 19 Drawing Sheets

(56) References Cited

U.S. PATENT DOCUMENTS

| | | |
|---|---|---|
| 9,451,722 B2 | 9/2016 | Alshinnawi et al. |
| 9,482,827 B2 * | 11/2016 | Haase ................ G02B 6/3869 |
| 2019/0098788 A1 | 3/2019 | Leigh et al. |
| 2020/0310063 A1 * | 10/2020 | Hutchison ............... H04Q 1/09 |

OTHER PUBLICATIONS

Molex; "HBMT High-density Optical Backplane Connector System"; Accessed Dec. 27, 2019 <https://www.molex.com/molex/products/family?key=hbmt_mt_high_density_backplane_interconnect_system&channel=products&chanName=family&pageTitle=Introduction>; 6 pgs.

Optical Connections; "Ez Shuffle Fibre Management Solution"; Jun. 11, 2018; Accessed Dec. 27, 2019; <https://opticalconnectionsnews.com/2018/06/ez-shuffle-fibre-management-solution/>; 3 pgs.; Nexus Business Media.

* cited by examiner

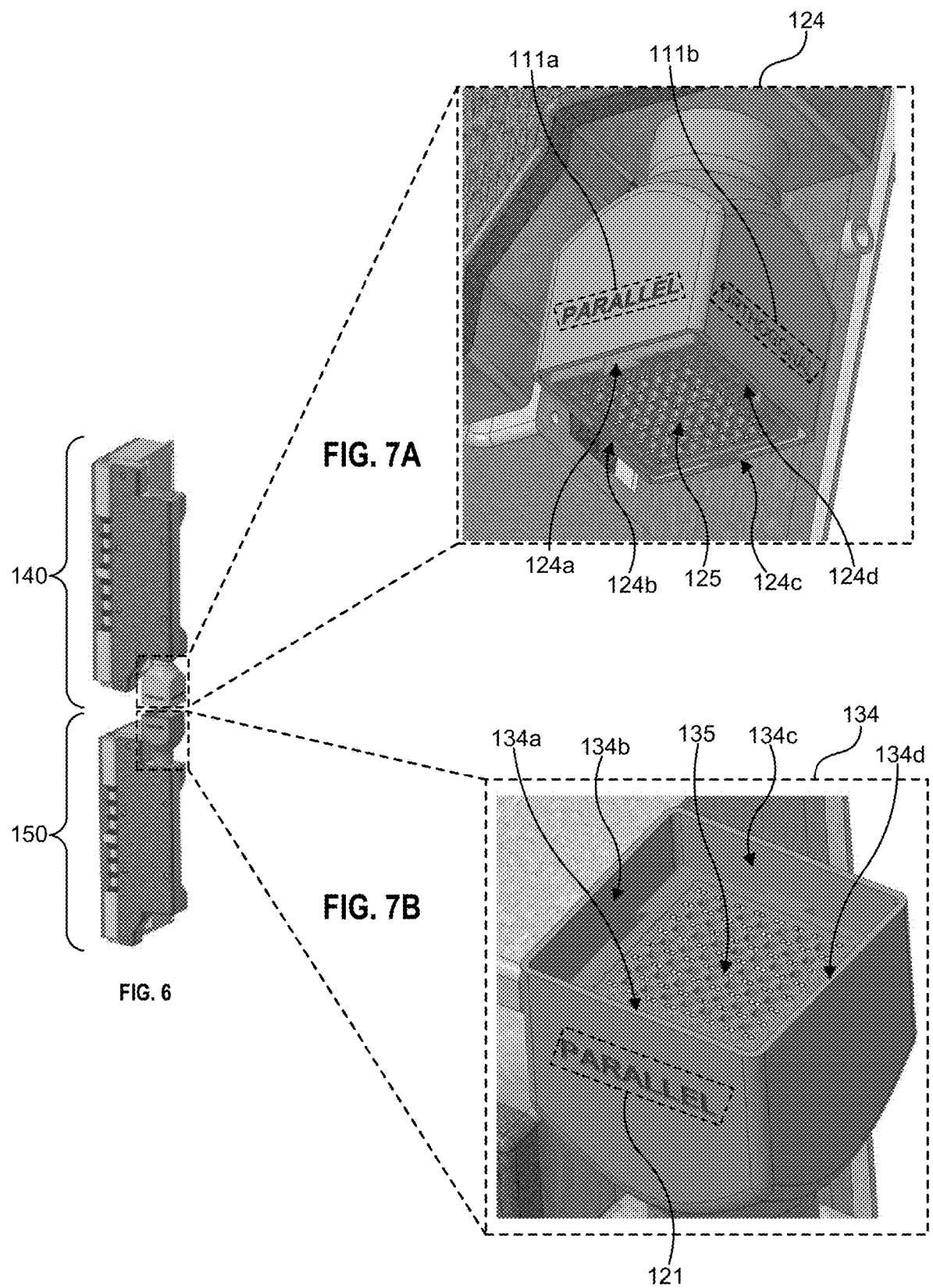

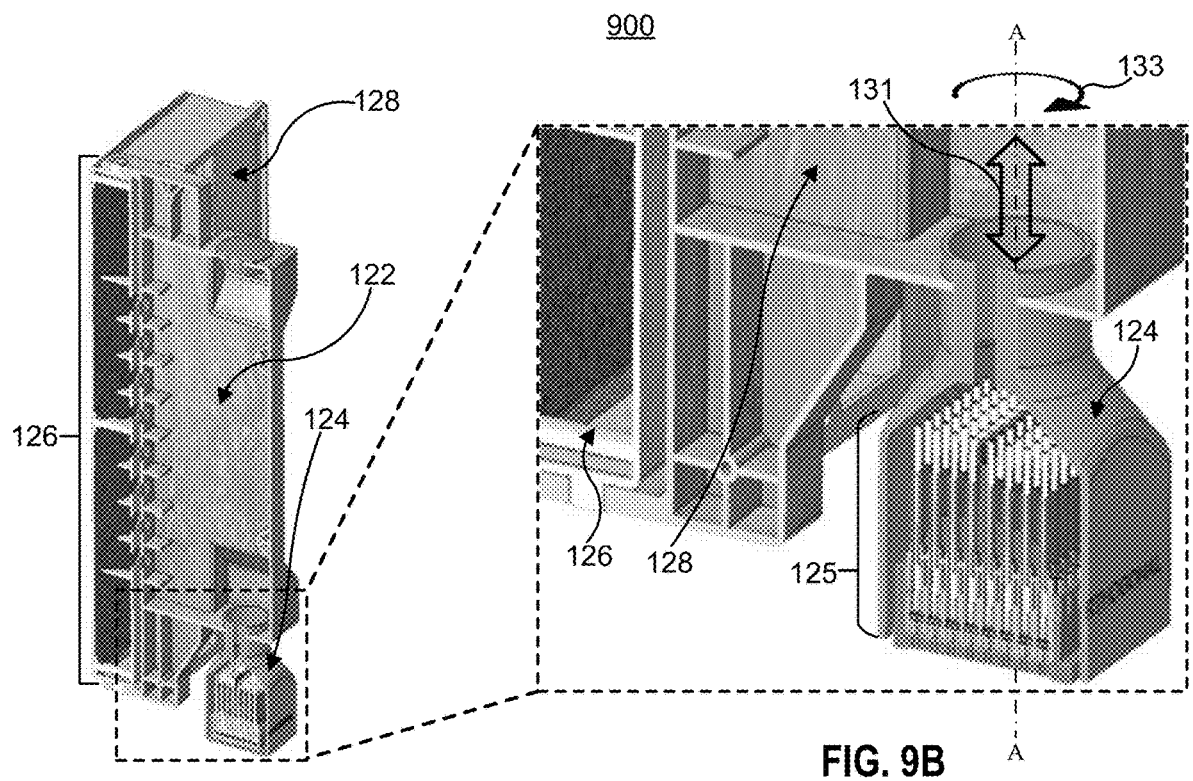
FIG. 9A
FIG. 9B
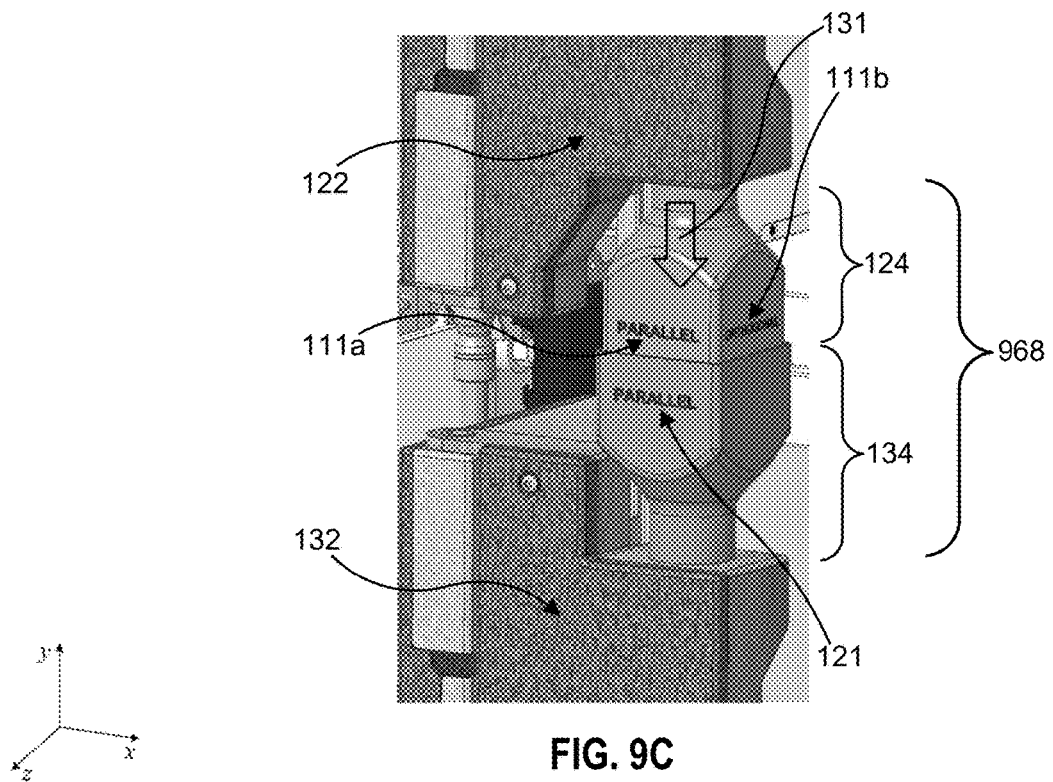
FIG. 9C

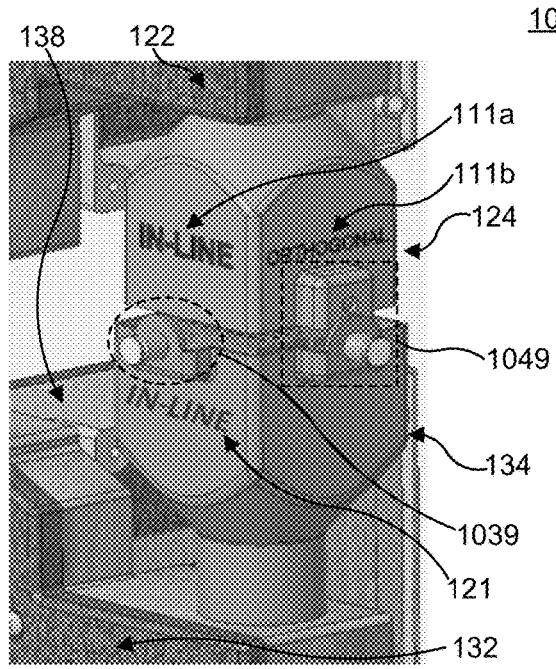
FIG. 10A
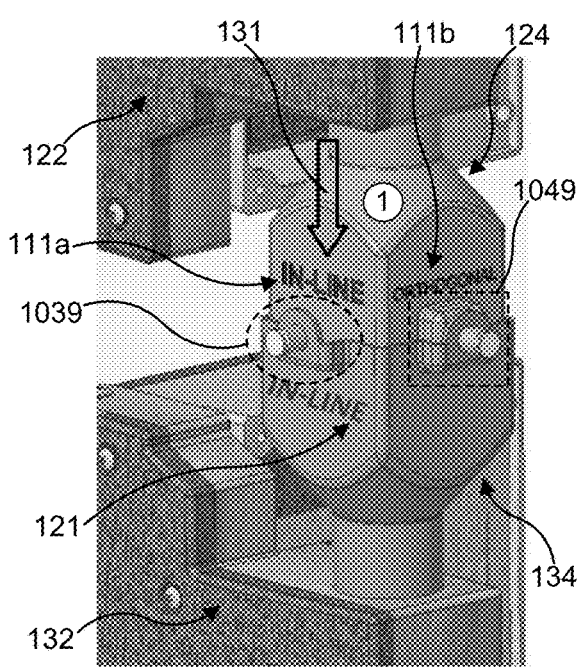
FIG. 10B
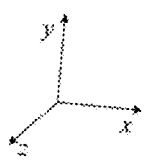
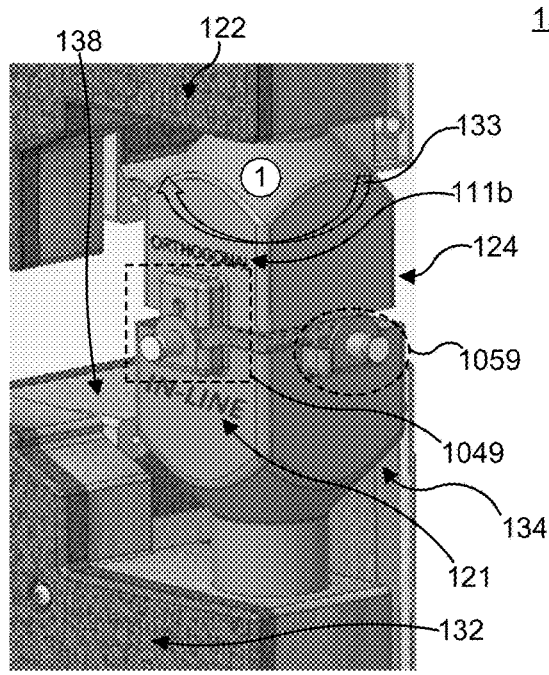
FIG. 10C
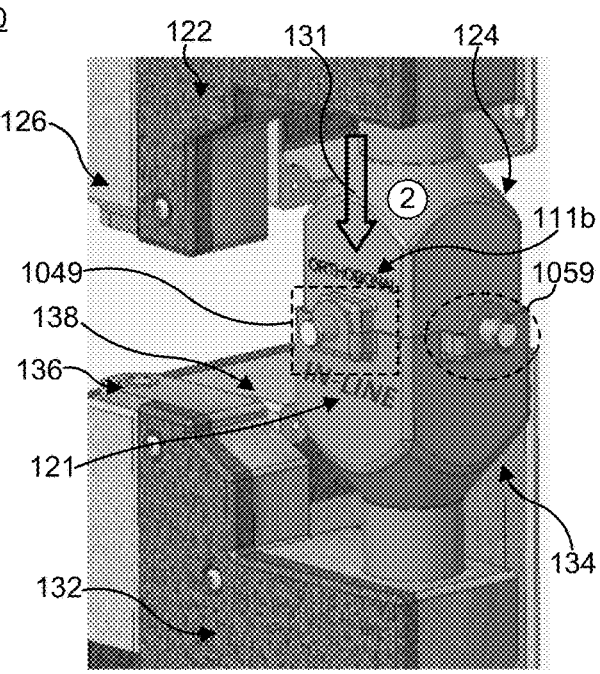
FIG. 10D

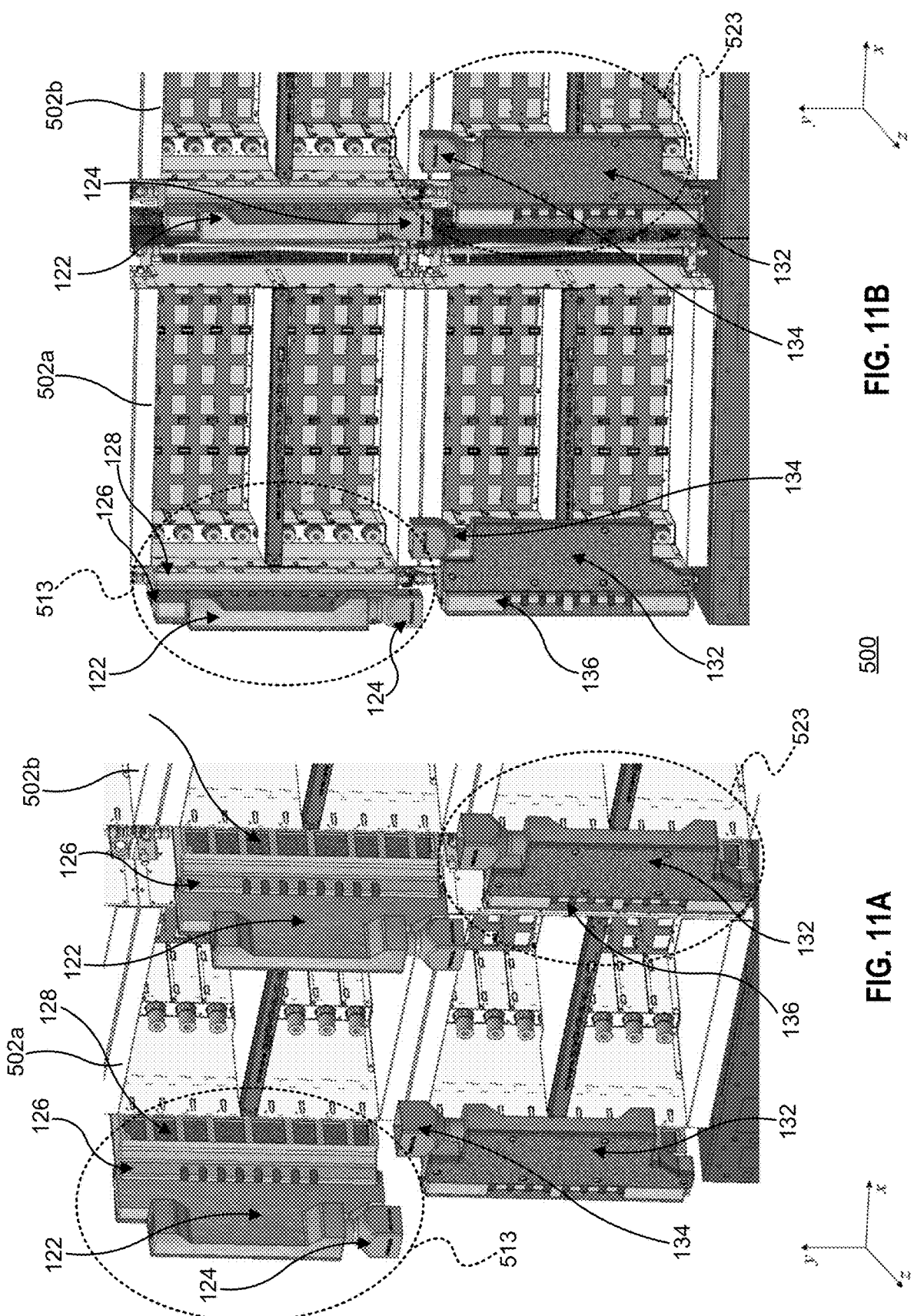

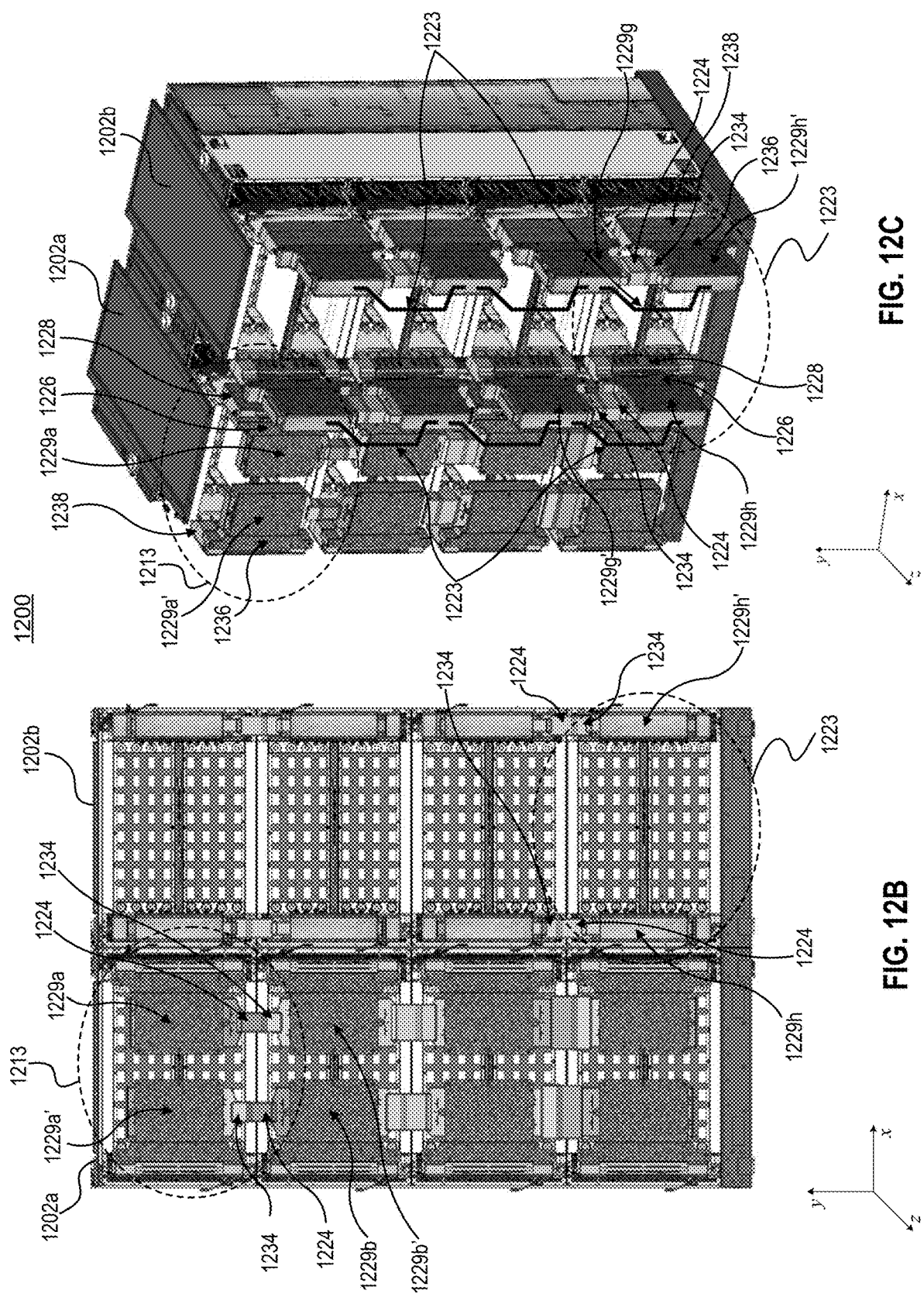

Open
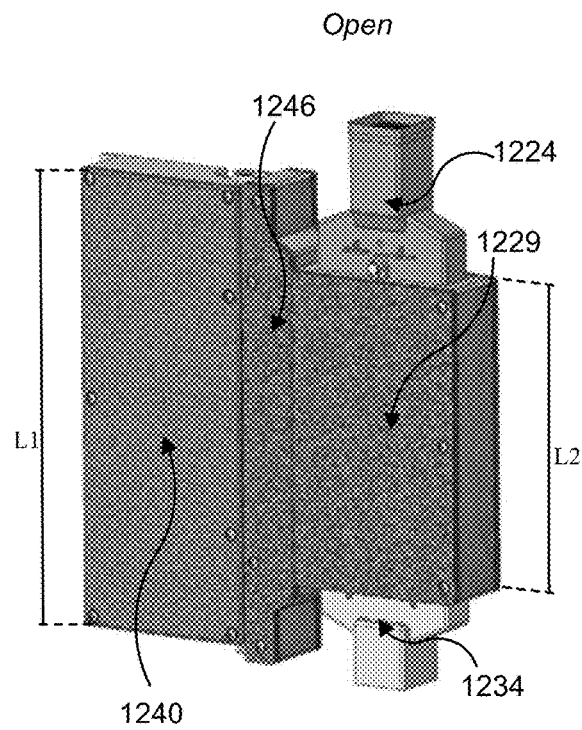
Back-hand FIG. 12D
Closed
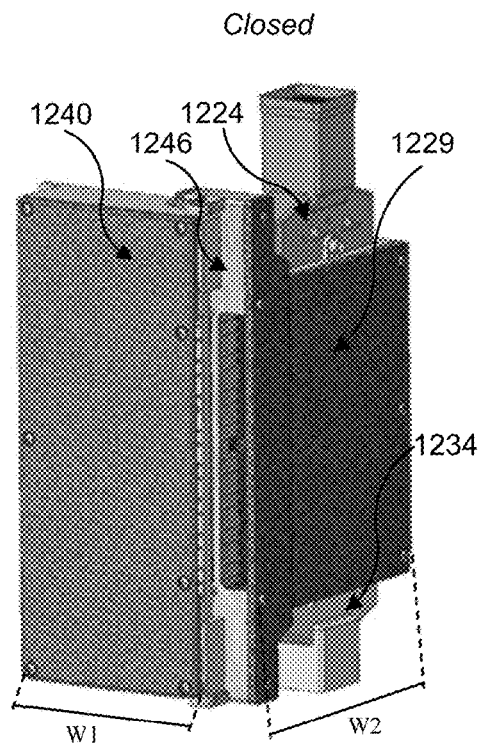
FIG. 12E
Palm-side
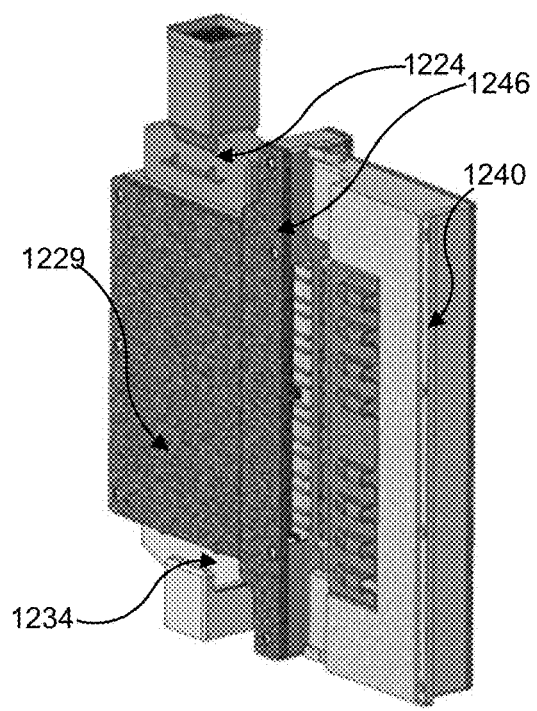
FIG. 12F
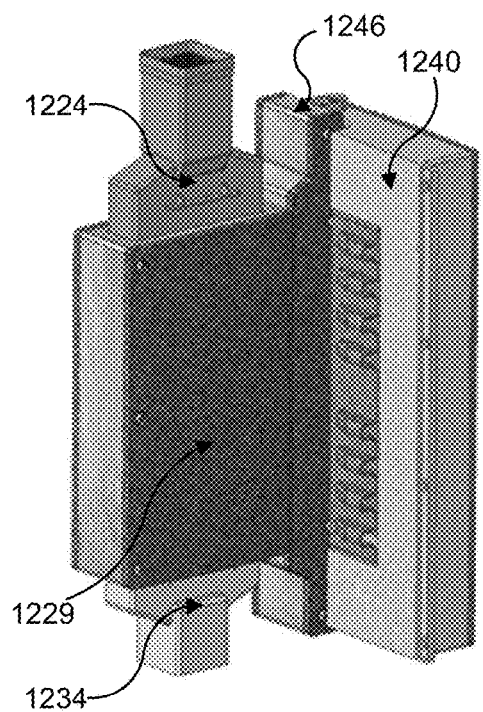
FIG. 12G

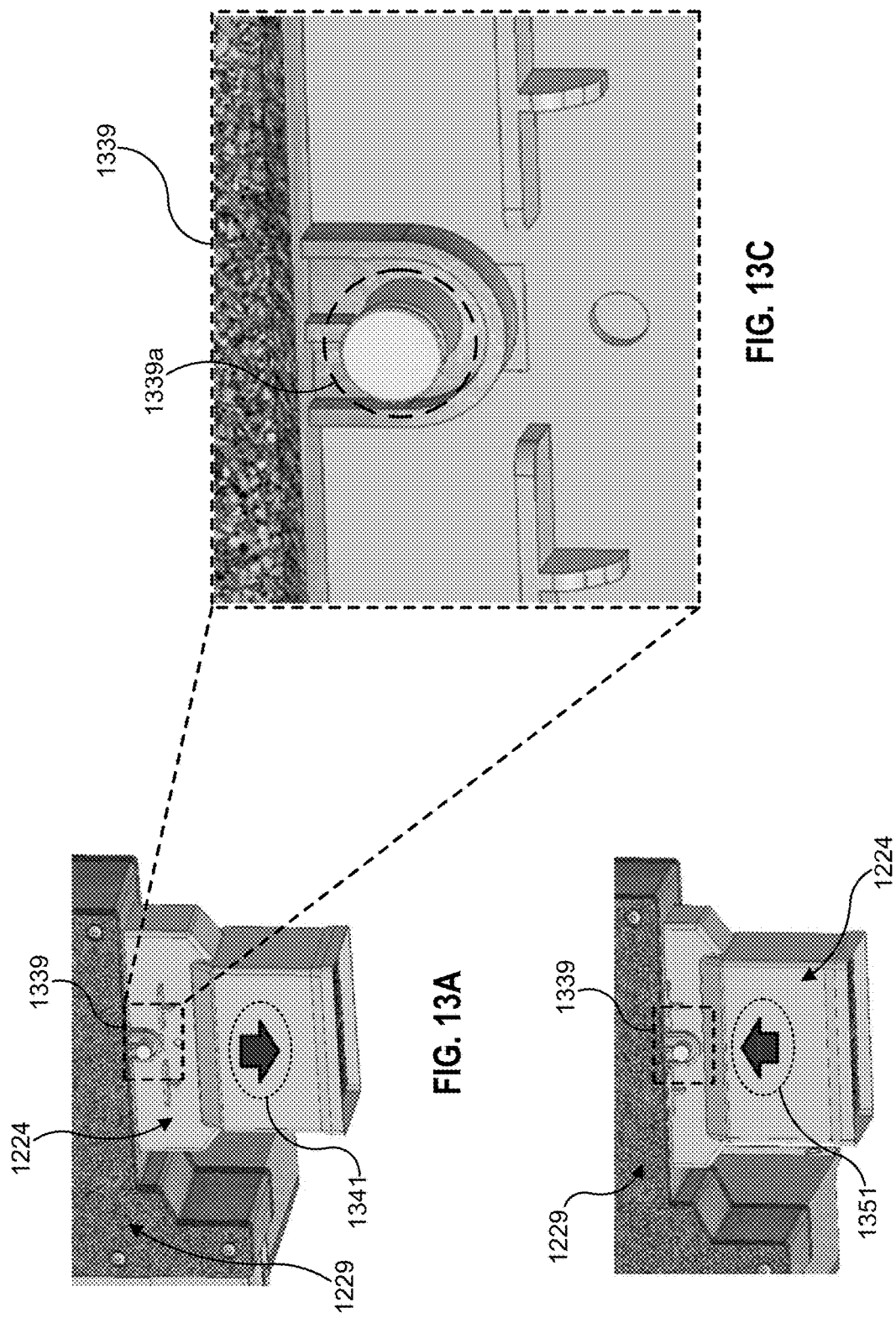

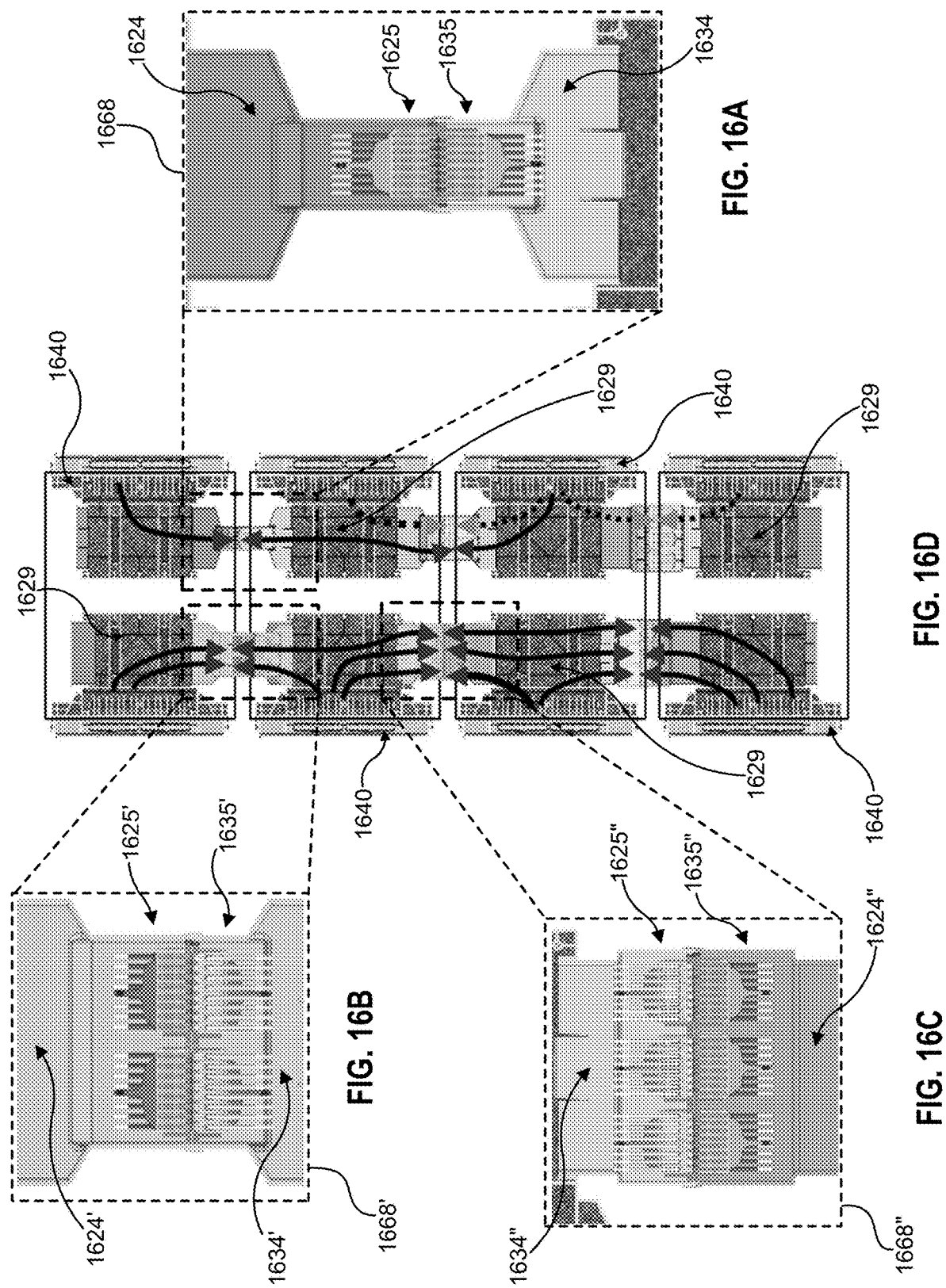

FIST-BUMP OPTICAL CONNECTOR BLINDMATING AMONG MULTIPLE ENCLOSURES IN A RACK

DESCRIPTION OF RELATED ART

Current information technology applications ranging from high density computing and networking to cloud computing and artificial intelligence require a substantial amount of connections (and interconnections) between components. These connections improve compute density by incorporating optical fiber shuffles and/or patch panels within existing floor space and rack space. These solutions effectively provide all-to-all connectivity within or among optical communication systems.

An optical fiber shuffle describes separating multiple fibers from each optical connector and connecting the fibers to multiple other optical connectors. The optical fibers may be routed manually or via automation and designed to fit a particular optical communication system. On the other hand, patch panels provide an array of optical fibers that are optically coupled to another array of optical fibers using faceplate connectors. Each faceplate connector has an optical cable attached containing one or more optical fibers. These techniques are expensive, labor intensive, and require considerable material infrastructure/space, such as wires, conduits, and/or faceplate connectors. Additionally, since optical fiber shuffles can be constructed in many ways, evolving requirements and/or redesigns of optical communication systems require new or reconstructed optical fiber shuffles (i.e., different fiber lengths, different connection topologies, etc.). Thus, as the demand for improved connectivity continues to grow, optical communication systems incorporating methods can become unduly complex and costly. Moreover, the time associated with implementation, maintenance, and redesigns can become prohibitive. As such, alternative solutions that can better address evolving requirements in optical communication systems continue to be explored.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 7A is a closer view of an example optical connector array incorporated in upper fist/first knuckle housing illustrated in FIG. 6.

FIG. 7B is a closer view of an example optical connector array incorporated in lower fist/second knuckle housing illustrated in FIG. 6.

FIG. 9A is a cross-sectional perspective view of an example upper articulating arm assembly in accordance with embodiments of the technology disclosed herein.

FIG. 9B is a closer view of an optical connector array of the example upper articulating arm assembly illustrated in FIG. 9A.

FIG. 9C is a closer view of a mated knuckle housing of the example upper and lower articulating arm assemblies illustrated in FIG. 6.

FIG. 10A is a first position in an example implementation of in-line fist-bump blindmating with the first knuckle retention feature in accordance with embodiments of the technology disclosed herein.

FIG. 10B is a second position in an example implementation of in-line fist-bump blindmating with the first knuckle retention feature in accordance with embodiments of the technology disclosed herein.

FIG. 10C is a first position in an example implementation of orthogonal fist-bump blindmating with the first knuckle retention feature in accordance with embodiments of the technology disclosed herein.

FIG. 10D is a second position in an example implementation of orthogonal fist-bump blindmating with the first knuckle retention feature in accordance with embodiments of the technology disclosed herein.

FIG. 11A illustrates example articulating arm assemblies/articulating plenums in an open position and a closed position in accordance with embodiments of the technology disclosed herein.

FIG. 11B illustrates another view of the example articulating arm assemblies/articulating plenums in an open position and a closed position in accordance with embodiments of the technology disclosed herein.

FIG. 12B shows a side view of an example wide articulating arm assembly in accordance embodiments of the technology disclosed herein.

FIG. 12C shows a front view of an example wide articulating arm assembly in accordance embodiments of the technology disclosed herein.

FIG. 12D shows a back-hand view of an example open position of wide articulating arm assembly in accordance embodiments of the technology disclosed herein.

FIG. 12E shows back-hand view of an example closed position of wide articulating arm assembly in accordance embodiments of the technology disclosed herein.

FIG. 12F shows a palm-side view of an example open position of wide articulating arm assembly in accordance embodiments of the technology disclosed herein.

FIG. 12G shows a palm-side view of an example closed position of wide articulating arm assembly in accordance embodiments of the technology disclosed herein.

FIG. 13A is an engaged position of an example implementation of a second knuckle retention feature in accordance with embodiments of the technology disclosed herein.

FIG. 13B is a recessed position of an example implementation of the second knuckle retention feature illustrated in 13A.

FIG. 13C is a closer view of the second knuckle retention feature illustrated in 13A.

FIG. 16A illustrates an example first configuration of optical connectors in wide-knuckle housings in accordance with embodiments of the technology disclosed herein.

FIG. 16B illustrates an example second configuration of optical connectors in wide-knuckle housings in accordance with embodiments of the technology disclosed herein.

FIG. 16C illustrates an example third configuration of optical connectors in wide-knuckle housings in accordance with embodiments of the technology disclosed herein.

FIG. 16D shows example connection paths of the different optical connectors in wide-knuckle housings illustrated in FIGS. 16A-16C.

Figure 1:
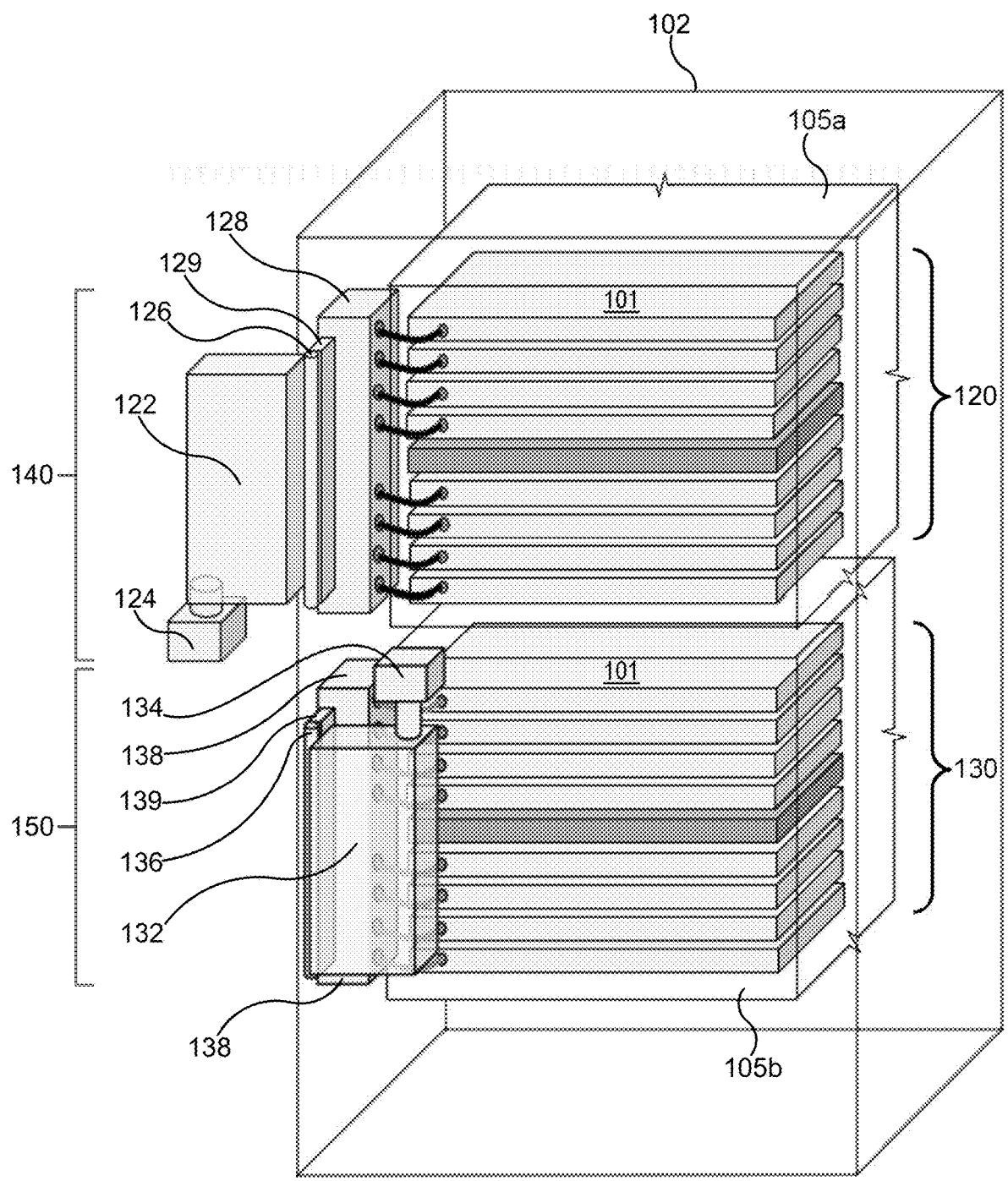
FIG. 1 is an example environment in which embodiments of the technology disclosed herein can be implemented.

The figures are not exhaustive and do not limit the present disclosure to the precise form disclosed.

DETAILED DESCRIPTION

Applications such as High Performance Computing (HPC), hyper-scale computing and large networks require a large number of optical fibers and corresponding optical connectors to be mated within equipment racks having nodes. For example, compute nodes, memory nodes, switch nodes, and/or a combination thereof may be present within enclosures of equipment racks. Current methods to connect nodes between enclosures include optical fiber shuffles and/or patch panels associated with equipment racks. While these methods can meet current modern application requirements, they are associated with several constraints that limit their applicability to emerging optical communication systems. For example, the serviceability of traditional optical communication systems can be hindered by a tangle of optical cables used to connect each optical connector for all-to-all connectivity among multiple systems. Moreover, the reconfigurability of optical communication systems using optical fiber shuffles is limited because each optical fiber shuffle has a fixed topology that is designed for a particular optical communication system. Furthermore, installing optical fiber shuffles requires additional connector stages that may introduce degradation to overall system connection reliability and may limit high-speed optical signal performance. Therefore, the increasingly complex world of optical connectivity has a need for high density solutions that streamline, improve access to connectors, and are customizable.

Embodiments of the technology disclosed herein offer improvements in the flexibility, performance, and appearance of intra-rack communication systems. The articulating arm assemblies (i.e., side plenums, arm plenums, plenum pivots, and knuckle housings) can provide cascading connections via "fist-bumps" (i.e., knuckle housings coupled to arm plenums act like human fists that engage with each other) which can enable rack-scale connectivity and customizable fiber topologies. These articulating arm assemblies can be designed to take a great deal of abuse and to be attached in the rear area of any conceivable rack (e.g., standard and custom). For example, side plenums and arm plenums can be used to form a protected environment for optical fibers and/or optical cables. Various embodiments of the technology disclosed herein broadly provide a set of nodes within an enclosure that can blindmate with another set of nodes within another enclosure. Blindmating between sets of nodes can enable connectivity between enclosures within a rack. In some embodiments, in-line blindmating and/or orthogonal blindmating may be achieved. When compared to conventional optical communication systems, installation of embodiments in the present disclosure require substantially less space and fewer connector stages. As such, it is unnecessary to increase the size of a structure or a support system to handle a high number and volume of optical fibers (i.e., high density) for high-performance computing systems. Additionally, the cost and time related to addressing continuous changes (e.g., redesigns) during the design and implementation stages can be substantially less or eliminated for embodiments of the present disclosure.

Some embodiments provide fist-bump optical connector blindmating using "knuckle" housings. The knuckle housing coupled to an end of each articulating arm plenum comprises a faceplate and a retention feature corresponding to the desired application. The faceplate contains an array of optical connectors which may include a duplex ferrule housing. Upper knuckle housing and lower knuckle housing are configured to mate or "fist-bump." An optical connection is formed when the upper knuckle housing and the lower knuckle housing are engaged. Further embodiments provide a retention feature in each knuckle housing which can securely lock the mated knuckles together to secure and/or stabilize a mated knuckle housing. The form of the retention feature depends on the width of each knuckle housing (e.g., narrow or wide) and type of optical connection. The width of each knuckle housing also corresponds to the number of optical connectors that can be incorporated within each knuckle housing. That is, wider knuckle housings may hold multiple optical connectors. Regarding, the type of optical connection may be varied by adjusting the orientation of the upper knuckle housing (e.g., in-line or orthogonal mating) prior to fist-bumping. As a non-limiting example, in-line mating provides fiber connection extensions between mating optical connectors and orthogonal mating provides all-to-all connectivity between mating optical connectors (further described below).

It should be noted that arm plenums, articulating arm plenums, articulating plenums, and swing-arm plenums may be used interchangeably and are to be interpreted as synonyms thereof. Further terms that correspond include first knuckle housing with upper knuckle, upper knuckle housing, upper fist, upper moving fist, dynamic knuckle, first knuckle housing, and/or equivalents thereof; second knuckle housing with lower knuckle, lower knuckle housing, lower fist, lower static fist, static knuckle, second knuckle housing and/or equivalents thereof; and mated/ing knuckle housing with mated/ing knuckle unit, mated/ing knuckles, composite or unitary knuckle housing, complementary mated/ing knuckles, locked/ing fist-bump, and/or equivalents thereof.

FIG. 1 illustrates an example environment 100 in which embodiments of the technology disclosed herein can be implemented, in accordance with the present disclosure. Where elements between figures are identified using the same references it should be interpreted that descriptions with respect to the reference applies equally in all instances of its use, unless otherwise stated. Example environment 100 includes a rack 102 comprising a first enclosure 105a and a second enclosure 105b. For clarity, two enclosures are illustrated, however, rack 102 can be configured to support a plurality of stacked enclosures in accordance with the design and and/or implementation of an optical communication system. Each enclosure 105a, 105b may comprise a plurality of interconnect trays 101 that are orthogonally connected to plurality of nodes in a node-set 120, 130, respectively. A non-limiting example of a node-set may be a set of server blades, in which each server blade may contain one or more nodes. An interconnect tray 101 may be an active type or a passive type. "Passive" here refers to an interconnect tray 101 that comprises components that do not require energy for operation. Conversely, "active" refers to an interconnect tray 101 that comprises at least one component that requires energy for operation. For example, a passive-type interconnect tray may contain passive fiber assemblies that directly connect to nodes in a node-set while an active-type interconnect tray may contain a network switch and optical transceiver components. A further example active-type interconnect tray may contain reconfigurable waveguide assemblies with silicon photonics components. Since a node-set and a set of interconnect trays are orthogonally connected within an enclosure, each node may be connected to all interconnect trays within the enclosure, and each interconnect tray is connected to all nodes in a node-set in the enclosure. For clarity, node-sets 120 and 130 are not illustrated but are represented by the curly brackets adjacent enclosures 105a and 105b in FIG. 1. In various embodiments, nodes in node-set 120, 130 may comprise computing equipment, including but not limited to processing nodes, acceleration nodes, server nodes, memory nodes, non-volatile storage nodes, switches, network routers, network bridges, among others. Embodiments of the present disclosure are applicable with any architectural environment requiring the intra-rack connection of enclosure-based or rack-mounted nodes, and should not be interpreted as limited to any specific type of equipment. As shown in FIG. 1, a first node-set 120 is orthogonally connected to a first subset of interconnect trays 101 within the first enclosure 105a, and a second node-set 130 is orthogonally connected to a second subset of interconnect trays 101 within the second enclosure 105b.

First arm plenum 122 and second arm plenum 132 are configured to be communicatively coupled, optically connecting first node-set 120 and second node-set 130. In various embodiments, first arm plenum 122 can comprise a first knuckle housing 124 disposed on a connector end of first arm plenum 122 and a first plenum pivot 126 disposed on an articulating side of first arm plenum 122. Correspondingly, second arm plenum 132 can comprise a second knuckle housing 134 disposed on a connector end of second arm plenum 132 and a second plenum pivot 136 disposed on an articulating side of second arm plenum 132. First knuckle housing 124 and second knuckle housing 134 can be configured to mate, resulting in optical fibers from first node-set 120 optically coupling with optical fibers from second node-set 130. In various embodiments, first arm plenum 122 and second arm plenum 132 may be movable via plenum pivots 126, 136. First plenum pivot 126 is configured to provide a pivot connection (e.g., hinge) to a first side plenum 128 and pivot first arm plenum 122 about an axis towards or away from an enclosure (i.e., in a horizontal direction). Stated differently, first plenum pivot 126 enables the first arm plenum 122 to pivot or articulate about side plenum 128 (about the y-axis) towards and away from the first enclosure 105a. Similarly, second arm plenum 132 can comprise a second knuckle housing 134 disposed on a connector end of second arm plenum 132 and a second plenum pivot 136 disposed on an articulating side of second arm plenum 132. Second plenum pivot 136 is configured to provide a pivot connection (e.g., hinge) to a second side plenum 138 and pivot second arm plenum 132 towards or away from an enclosure (i.e., in a horizontal direction). In some embodiments, arm plenums 122, 132 may be pivotally coupled to the second side of the corresponding side plenum 128, 138 such that arm plenums 122, 132 can be configured to be rotatable about an axis extending parallel to the second side of corresponding side plenums 128, 138.

In several embodiments, each side plenum 128, 138 may further comprise a side plenum extension 129, 139. A first side plenum extension 129 can be disposed between first plenum pivot 126 and first side plenum 128 to grant greater mechanical clearance for arm plenum 122 to freely rotate about plenum pivot 126. First side plenum extension 129 also provides a larger mechanical clearance between knuckle housing 124 and the faceplates of interconnect trays 101. In one embodiment, first plenum pivot 126 may be disposed on or integrated with a first end of side plenum extension 129 while a second end of side plenum extension 129 can be attached to side plenum 128. First side plenum 128 includes a side attached to first side plenum extension 129 and/or first plenum pivot 126 and a side attached to rack 102. The side attached to rack 102 may comprise a modular coupling to the side panel of enclosure 105a.

Notably, side plenum extension 129 may further be configured to increase a radius of curvature of the arm plenum during rotation of the arm plenum. For example, a first 122 or second arm plenum 132 can be rotatable about an axis extending parallel to the second side of the side plenum and during this rotation if a side plenum 129 is incorporated, the radius of curvature of arm plenums 122, 132 may be increased so as to avoid contact with other components in articulating arm assemblies as well as racks. According, a more fluid and free rotation is provided by the integration of first side plenum extension 129 or second side plenum extension 139 in first side plenum 128 and second side plenum 138, respectively.

A second side plenum extension 139 mirrors the arrangement of first side plenum extension 129 and comprises equally applicable advantages regarding mechanical clearance. Likewise, second plenum pivot 136 may be disposed on or integrated with a first end of side plenum extension 139 while a second end of side plenum extension 139 can be attached to side plenum 138. Second side plenum 138 comprises a side attached to second side plenum extension 139 and/or second plenum pivot 136 and a side attached to rack 102. The side attached to rack 102 may comprise a modular coupling to the side panel of enclosure 105b.

The integration of described side plenums, arm plenums, plenum pivots, and knuckle housings may form respective articulating arm assemblies 140, 150. A first articulating arm assembly 140 may comprise side plenum 128, a plenum pivot 126, arm plenum 122, and knuckle housing 124. A second articulating arm assembly 150 may comprise side plenum 138, plenum pivot 136, arm plenum 132, and knuckle housing 134. These articulating arm assemblies can be designed to take a great deal of abuse and to be attached in the rear area of any conceivable rack (e.g., standard and custom). In one example embodiment, side plenums and arm plenums can be used to form a protected environment for optical fibers and/or optical cables.

In accordance with embodiments of the present disclosure further described below, side plenums 128, 138, pivot plenums 126, 136, arm plenums 122, 132, and knuckle housings 124, 134 describe the building blocks of upper/first and lower/second articulating arm assemblies that can address the deficiencies associated with existing solutions for complex connectivity in optical communication systems. For example, in optical communication systems that include fiber trays that are orthogonally connected to multiple nodes within an enclosure (further described above), articulating arm assemblies 140, 150 can eliminate or reduce the need for numerous connections between enclosures and/or nodes of a rack, expediate installation and serving of nodes without sacrificing performance, and enable customizable fiber topologies within a protected environment.

Figures 2A, 2B, 2C:
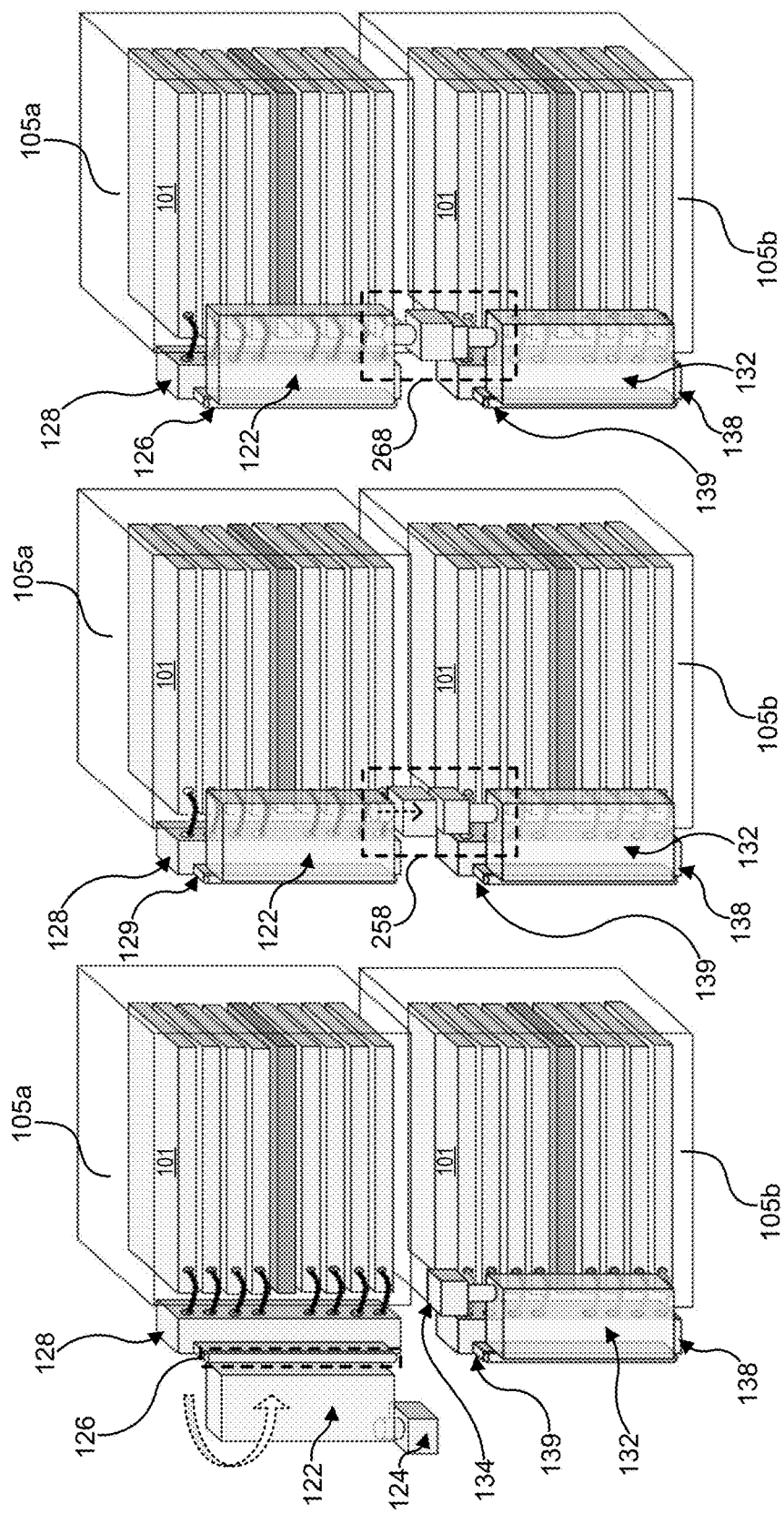
FIG. 2A shows a first position of in-line mating an example upper fist and an example lower fist in accordance with embodiments of the technology disclosed herein.
FIG. 2B shows a second position of in-line mating an example first articulating arm assembly and an example second articulating arm assembly in accordance with embodiments of the technology disclosed herein.
FIG. 2C shows a third position of in-line mating an example first articulating arm assembly and an example second articulating arm assembly in accordance with embodiments of the technology disclosed herein.

FIGS. 2A-2C illustrate an example environment 200 enabling intra-rack connectivity via the transition of articulating arm assemblies 140, 150 from a first position to a third position in accordance with embodiments of the present disclosure. Environment 200 includes two enclosures, a first enclosure 105a and a second enclosure 105b. Each enclosure 105a, 105b may comprise a plurality of interconnect trays 101 that are orthogonally connected to plurality of nodes in node-set (further described in reference to FIG. 1 above). As shown by moving from FIG. 2A to FIG. 2C, first arm plenum 122 can be rotated from a first position to a third position.

FIG. 2A shows a first position of in-line mating an example first articulating arm assembly and an example second articulating arm assembly in accordance with embodiments of the technology disclosed herein. The first position comprises articulating arm assemblies 140, 150 that are not placed or arranged in a straight line. That is, arm plenums 122, 132 of articulating arm assemblies 140, 150 are unaligned (i.e., arm plenums are not directly above or below each other). As illustrated in FIG. 2A, first arm plenum 122 is unaligned with second arm plenum 132. As such, respective articulating arm assemblies are not engaged with each other. In the first position, at least one arm plenum is in an open position and at least one arm plenum is in a closed position. When an arm plenum is disposed away from or outside an associated enclosure, the arm plenum is in an open position. Accordingly, access to respective enclosures or contents of a rack for installation, maintenance, and/or servicing is easily achieved. On the other hand, when an arm plenum is disposed closer or inside an associated enclosure, the arm plenum is in a closed position and access to the contents of a rack is limited. In FIG. 2A, first arm plenum 122 is in the open position while second arm plenum 132 is in the closed position.

FIG. 2A further illustrates in the open position, first arm plenum 122 can be configured to rotate 180 degrees to the closed position (shown in FIG. 2B). While not shown, second arm plenum 132 can also be configured to rotate 180 degrees from the open position to the closed position. In some embodiments, first arm plenum 122 can be pivotable around first plenum pivot 126, second enclosure plenum 132 can be pivotable around second plenum pivot 136, and/or a combination thereof.

In various embodiments, to initiate blindmating between first articulating arm assembly 140 and second articulating arm assembly 150, first arm plenum 122 may be pivoted to be rotated in the horizontal direction to a position above second arm plenum 132, such as the position shown in FIG. 2B. First arm plenum 122 may move towards or away from an enclosure to reach a position above second arm plenum 132. For example, if second arm plenum 132 is outside an adjacent enclosure, first arm plenum 122 may pivot in a direction away from the enclosure to align with second arm plenum 132. First 122 and second arm plenum 132 may be configured to be pivotable about an axis to a position proximal an enclosure or a position distal an enclosure depending on the status of the network rack. Conceptually, first arm plenum 122 swings to the second position for alignment of first knuckle housing 124 and second knuckle housing 134. Arm plenums 122, 132 may also be configured to pivot out of the closed position in addition to into the closed position via plenum pivots 126, 136 accordance with the needs or status of the optical communication system. The mobility of arm plenums 122, 132 away from enclosures 105a, 105b improves access for installation, removal, and/or maintenance of interconnect trays 101.

FIG. 2B illustrates a second position of in-line mating the example first articulating arm assembly and the example second articulating arm assembly illustrated in FIG. 2A. The second position 258 comprises arm plenums 122, 132 of articulating arm assemblies 140, 150 that are placed in a straight line or aligned. As illustrated in FIG. 2B, first arm plenum 122 is aligned with second arm plenum 132 in response to movement or rotation of first arm plenum 122. While FIG. 2B demonstrates first arm plenum 122 and second arm plenum 132 aligned in the closed position, first arm plenum 122 and second arm plenum 132 may also be aligned in the open position. Thus, the second position includes arm plenums 122, 132 aligned in either the closed or position which are inside or outside an enclosure, respectively. Upon alignment of first 122 and second arm plenum 132, respective knuckle housings 124, 134 may be mated.

FIG. 2C shows a third position of in-line mating the example first articulating arm assembly and the example second articulating arm assembly illustrated in FIG. 2A. The third position comprises knuckle housings 124, 134 of respective arm plenums 122, 132 engaged with each other. After rotation to the second position shown in FIG. 2B, first knuckle housing 124 can be translated or slide in the vertical direction (along y-axis) to a position that engages or mates the second knuckle housing 134, seen in FIG. 2C. First knuckle housing 124 (upper fist) may initiate a "fist-bump" or contact with second knuckle housing 134 (lower fist) to form a mated knuckle housing 268. Mated knuckle housing 268 establishes an optical connection between first articulating arm assembly 140 within first enclosure 105a and second articulating arm assembly 150 within second enclosure 105b. As discussed above, arm plenum 122, 132 may be aligned in the open and closed position. Thus, mated knuckle housing 268 or optical interconnects may be formed inside as well as outside an enclosure.

Figures 3A, 3B, 3C:
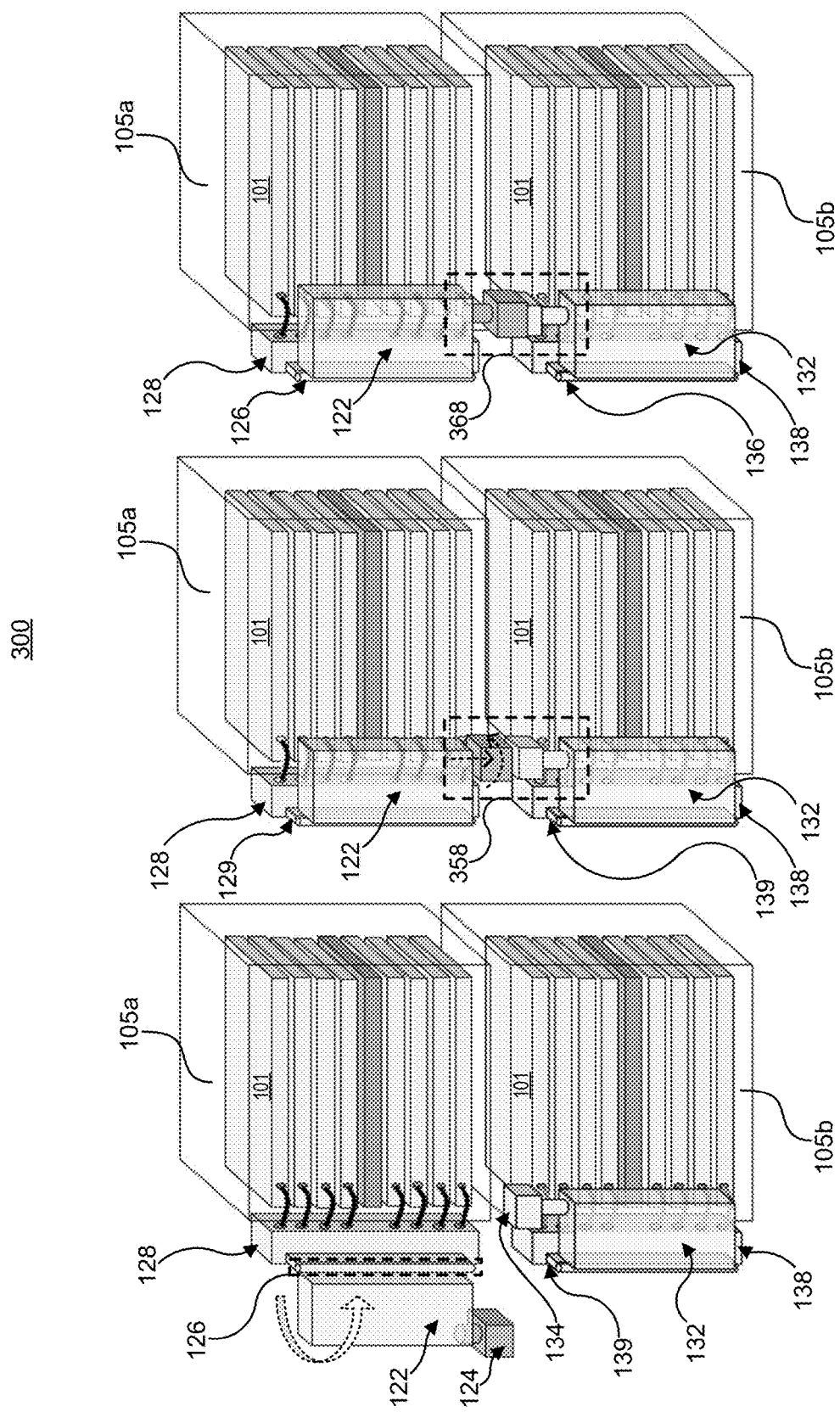
FIG. 3A shows a first position of orthogonal mating an example first articulating arm assembly and an example second articulating arm assembly in accordance with embodiments of the technology disclosed herein.
FIG. 3B shows a second position of orthogonal mating an example first articulating arm assembly and an example second articulating arm assembly in accordance with embodiments of the technology disclosed herein.
FIG. 3C shows a third position of orthogonal mating an example first articulating arm assembly and an example second articulating arm assembly in accordance with embodiments of the technology disclosed herein.

FIGS. 3A-3C show varying positions of orthogonal mating an example first articulating arm assembly and an example second articulating arm assembly in accordance with embodiments of the technology disclosed herein. Although discussed with respect to in-line mating above, the description of the illustrative embodiments of FIGS. 2A-2C apply equally to orthogonal mating in FIGS. 3A-3C with the exception of an additional rotation of first knuckle housing 124 indicated in FIG. 3B modifying the optical connection formed by mated knuckle housing 368.

Briefly, as to FIG. 3A, to align first arm plenum 122 with second arm plenum 132, arm plenum 122 can be pivoted to be rotated in the horizontal direction (along the x-axis) to a position above second arm plenum 132, such as the position 358 shown in FIG. 3B. Unlike FIG. 2B, first knuckle housing 124 can also be configured to rotate about an its own access. Rotation about its own axis allows first knuckle housing 124 to quickly and easily modify an orientation of optical connector arrays therein. In one non-limiting example, the initial state of connector arrays establishes in-line connections with adjacent enclosures such as the initial state demonstrated in FIG. 2C. However, an orthogonal connection may also be accomplished due to first knuckle housing's 124 rotation on its own axis. First arm plenum 122 can be configured not to move while first knuckle housing 122 rotates about its own axis. First arm plenum 122 can be configured to rotate 360 degrees about itself. That being said, in an exemplary embodiment, first knuckle housing 124 rotates about itself approximately 90 degrees dependent on the initial orientation of optical connector arrays. Accordingly, connector arrays can be orthogonally blindmated (i.e., all-to-all connectivity) when first knuckle housing 124 rotates about itself (i.e., rotates on a fixed point) and then translates to engage second knuckle housing 134 in the third position. FIG. 3C demonstrates that first knuckle housing 124 can be translated or slide in the vertical direction (along y-axis) to a position that engages or mates the second knuckle housing 134. In both FIGS. 2C and 3C, the first knuckle housing 124 blindmates, or "fist-bumps," with the second knuckle housing 134 to create mated knuckle housings 268, 368 upon translation of the first knuckle housing 124.

Figure 4:
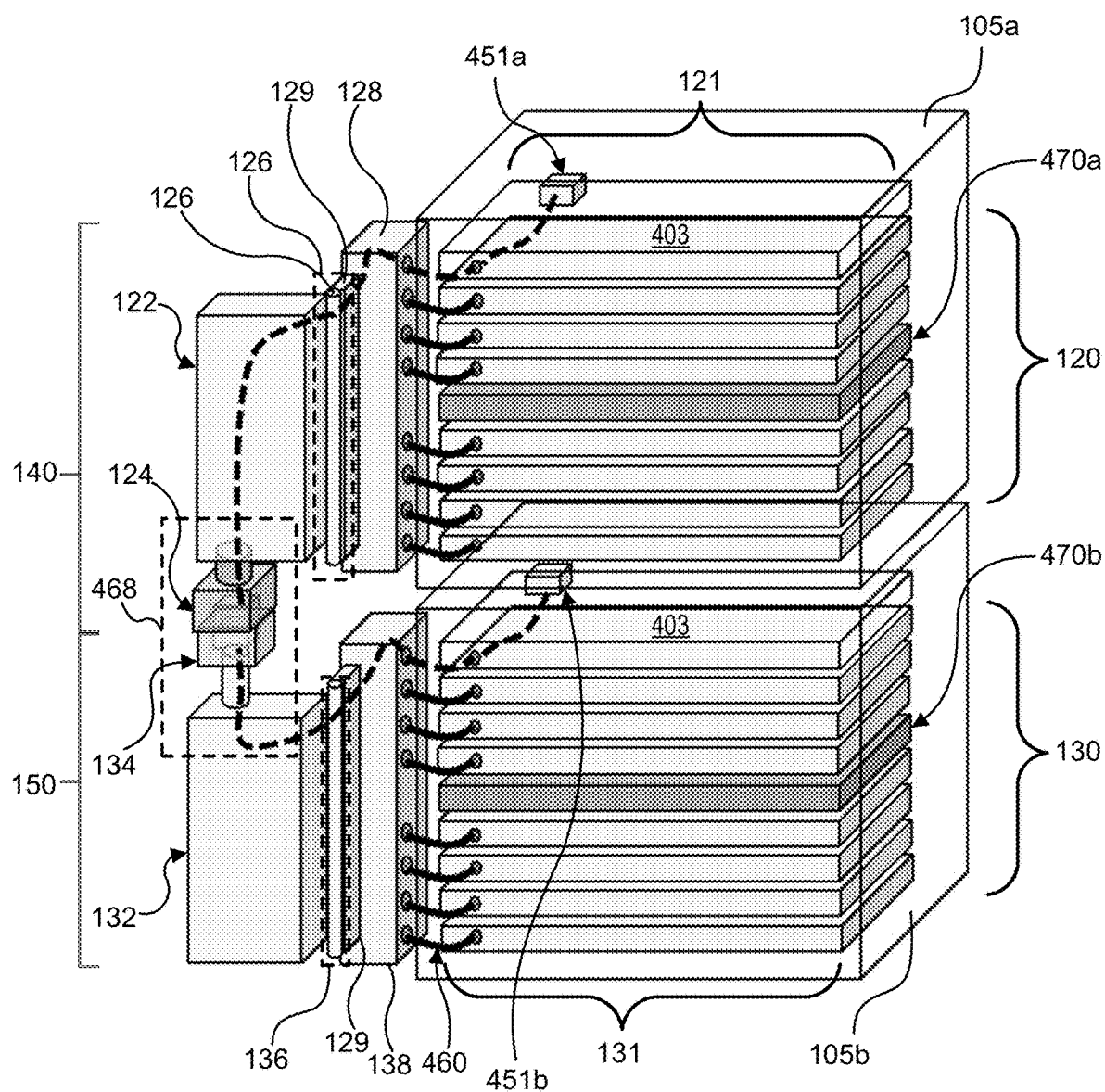
FIG. 4 illustrates a pseudo rack-plane blindmating mechanism in the accordance with embodiments of the technology disclosed herein.

FIG. 4 illustrates a pseudo rack-plane blindmating mechanism 400 in the accordance with embodiments of the technology disclosed herein.

Before defining the embodiment of FIG. 4, the following definitions and descriptions clarify terms used to describe embodiments of the present disclosure. To start, as defined herein, "rack-plane" refers to an infrastructure in a rack where connections span across multiple systems in a rack. As defined herein, "backplane" refers to a connection infrastructure where system modules may be blindmated. A backplane connection infrastructure may contain high-speed data signals, low-speed management signals, and power. A backplane may be disposed within at least one enclosure of a plurality of enclosures within a rack. The term "midplane" is for connection infrastructure where front system modules are blindmated with rear system modules within an enclosure, where there may be a plurality of enclosures within a rack. As defined herein, "rack-plane" refers to an infrastructure in a rack where connections span across multiple systems in a rack. In a traditional enclosure, such as a blade server enclosure, front system modules (e.g., servers) are orthogonally connected to rear system modules (e.g., switches) via a physical mid-plane where the mid-plane has blindmate connectors facing the front for the front system modules to blindmate to, and blindmate connectors facing the rear for the rear system modules to blindmate to. A midplane may have integrated signal paths among the blindmate connectors mounted on the midplane. The front and rear references are with respect to rack, e.g., the front side of a rack is where users have easier access to system and sub-system modules to be serviced, and where displays and indicators can be easily visible, and the rear side of a rack is where cable connections are typically present. As defined herein, "pseudo midplane" describes a planar area where front and rear system modules are orthogonally and directly connected, i.e., front modules have blindmate connectors and rear modules have complementary blindmate connectors, where the front modules and rear modules are orthogonally connected without needing a physical mid-plane between them. Please note that blindmate connectors may be referred to interchangably as "midplane connectors." In a pseudo rack-plane, the connections spanning across multiple systems in a rack are achieved by extending the pseudo midplane connections within each enclosure, followed by enabling the extended mid-plane connections across multiple enclosures to be interconnected within a rack. For example, interconnect trays 101 replace traditional rear system modules to interconnect with node-set 120, where the interconnect trays 101, along with the plenums, can be parts of the rack-plane infrastructure. The ensemble comprising the interconnect trays 101 and the plenums serve as a partial rack-plane, and the interconnected ensembles (via knuckle housing 124, 134) serve as a rack-plane.

As to FIG. 4, mid-plane connector 451a, 451b are illustrated in each enclosure for forming a connection via the subcomponents of articulating arm assemblies 140, 150 in a rack as illustrated in FIGS. 1-3. For simplicity, FIG. 4 only shows one mid-plane connector 451a, 451b in each enclosure 105a, 105b, respectively. Each interconnect tray of interconnect tray set 121 comprises plurality of mid-plane connectors 451a in enclosure 105a. A vertical column of mid-plane connectors 451a in enclosure 105a may be orthogonally mated to a node in first node-set 120 in enclosure 105a. Therefore, a horizontal array of mid-plane connectors 451a in all interconnect trays of interconnect tray set 121 may orthogonally, and fully, connected to all the nodes in first node-set 120 in enclosure 105a. Similarly, a horizontal array of mid-plane connectors 451b in all interconnect trays of interconnect tray set 131 may orthogonally and fully connected to all the nodes in second node-set 130 in enclosure 105b. Therefore, a node in first node-set 120 is at least connected to a node in second node-set 130 via the connected chain comprising mid-plane connector 451a, the subcomponents of articulating arm assemblies 140, 150, and eventually mid-plane connector 451b. Furthermore, interconnect trays 121, 131 as well as fiber plenums in articulating arm assemblies 140, 150 may contain fiber assemblies that will allow nodes in first node-set 120 and nodes in second node-set 130 to be all-to-all connected. For brevity, nodes of node-sets 120, 130 are not explicitly illustrated in FIG. 4.

As illustrated, a first node-set 120 is connected to second node-set 130 to provide connectivity within rack 102 (as illustrated in FIG. 1). In various embodiments, the optical connections from first node-set 120 can be routed to first arm plenum 122 and the optical connections from second node-set 130 can be routed to second arm plenum 132. In various embodiments, first arm plenum 122 and second arm plenum 132 can be disposed on one side or both sides of an interior rear portion of rack 102, while in other embodiments each plenum 122, 132 can be disposed on an external side of rack 102. When disposed on rack 102, arm plenum 122 and second arm plenum 132 enable the optical connections between first node-set 120 and second node-set 130 to be moved from within each enclosure 105a, 105b to outside of enclosures 105a, 105b but within rack 102. By allowing the connections between node-set 120 and node-set 130 to be via a rack-plane within rack 102 (as described above) facilitates easier scaling, installation and maintenance of environment 100. In some embodiments, first arm plenum 122, second arm plenum 132, or both can be pivotable around plenum pivots 126, 136, configured to move from a first position into a second position.

Further shown in FIG. 4, first enclosure 105a comprises a first node-set 120 and second enclosure 105b comprises a second node-set 130, each node-set 120, 130 comprising a respective plurality of nodes (not shown). Nodes within first enclosure 105a and second enclosure 105b may be disposed on a front side of first enclosure 105a and second enclosure 105b (i.e., the non-facing side of rack 102 in FIG. 1). Optical fibers from midplane connector 451a, that are directly blindmated to first node-set 120, may be routed through interconnect trays 403 of first interconnect tray set 121 in first enclosure 105a (Note: only one mid-plane connector in each of the two cable trays are illustrated for simplicity). Similarly, a second mid-plane area separates the front side of second enclosure 105b from the back side of second enclosure 105b, where a second interconnect tray set 131 comprising a plurality of interconnect trays 403 can be disposed. Optical fibers from second node-set 130 are routed to second interconnect tray set 131 through mid-plane connector 451b through the second midplane area of second enclosure 105b. In an exemplary embodiment, a single connector stage is implemented in mated knuckle housing 468 to connect between mid-plane connectors 451a, 451b of enclosures 105a, 105b in rack 102. Mid-plane connectors 451a, 451b may be optical blindmate connectors. Additionally, in further embodiments, an enclosure manager tray may be coexist with plurality of interconnect trays 403 in an enclosure. A first enclosure manager tray 470a and a second enclosure manager tray 470b are illustrated by shaded interconnect trays 403 in each enclosure 105a, 105b. Each enclosure manager tray 470a, 470b can monitor, configure and/or control the functions of nodes in node-sets 120, 130, as well as other infrastructure life support components such as power supplies and cooling devices. Each enclosure manager tray 470a, 470b can also detect and configure waveguide assemblies within interconnect trays 403. These waveguide assemblies may include pass-through fibers, fiber shuffles, reconfigurable waveguides, and/or additional optical components configured to guide optical signals. Furthermore, each enclosure manager tray 470a, 470b may be configured to communicatively couple with one or more additional enclosure manager trays that share an enclosure with first enclosure manager tray 470a or second enclosure manager 470b.

Fibers 460 of nodes in first node-set 120 may be routed out of first enclosure 105a through interconnect tray 403 of first interconnect tray set 121, then into first side plenum 128, and first arm plenum 122. Similarly, fibers 460 of nodes in second node-set 130 may be routed out of second enclosure 105b through interconnect tray 403 of second interconnect tray set 131, then into second side plenum 138, and second arm plenum 132. This conceptually moves the optical connections on the back of the nodes from each midplane inside first enclosure 105a and second enclosure 105b, respectively, to outside of the enclosures. A group of fibers 460 may be protected by using fiber boots (not shown). Fiber boots may be made of fabric, plastic, rubber, metal, or a combination thereof.

By moving the optical connections traditionally found in the midplane of an enclosure to the exterior of the enclosure, and by the use of bare fibers and high-density optical blindmate connectors in protected environment of first knuckle housing 124 and second knuckle housing 134, embodiments of the present disclosure allow for a rack-scale blindmate connection, reducing the need for complex and expensive fiber shuffle designs and untenable cable routing that may block air flow in the rear areas of a rack. The blindmating technology disclosed herein further allows for optical connections to be designed in a variety of different configurations. Environments 200, 300 of FIGS. 2 and 3 illustrate intra-rack plenum configuration disposed on one side in the rear of rack 102 in accordance with embodiments of the present disclosure.

Figure 5:
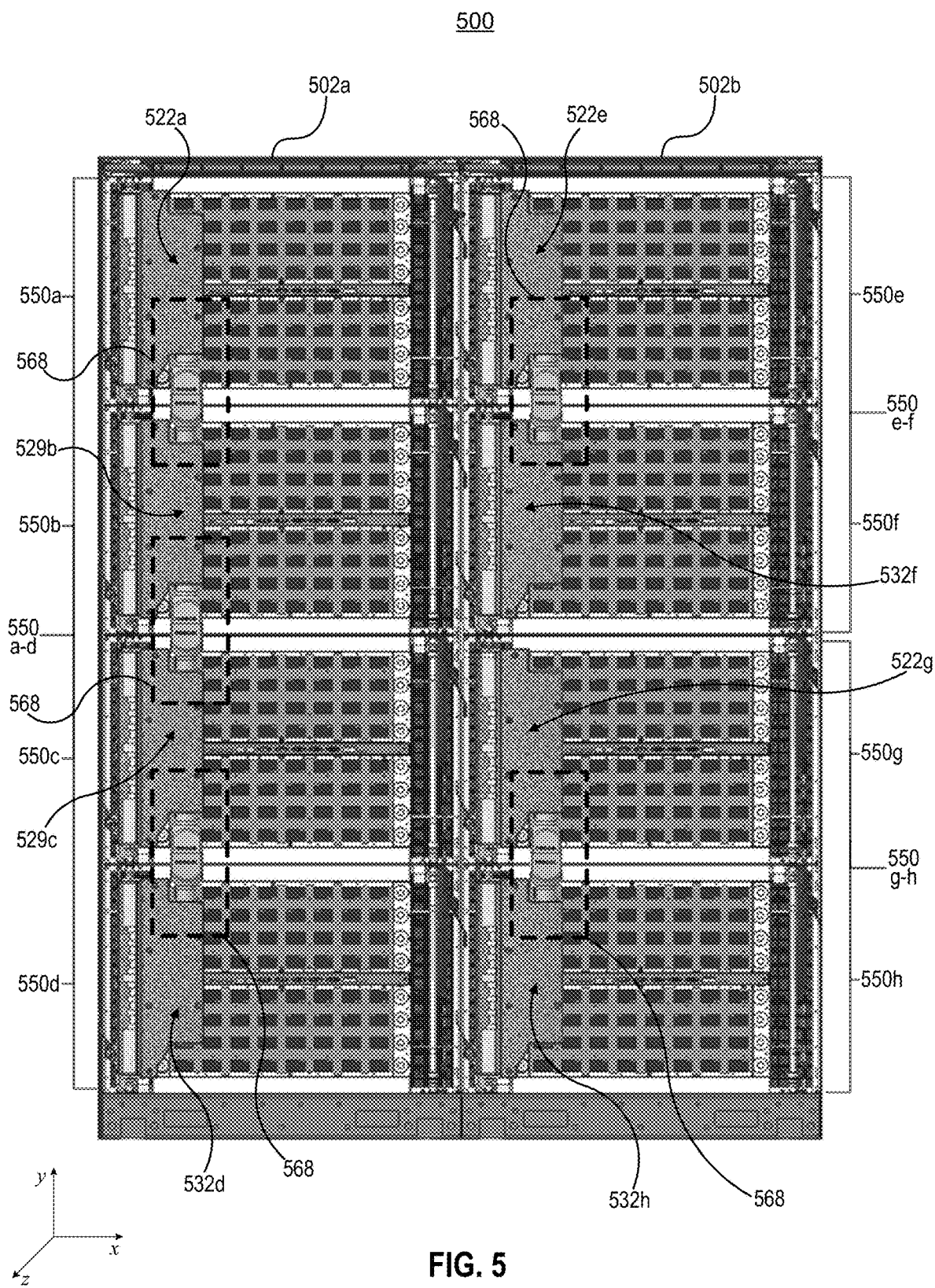
FIG. 5 illustrates another example environment in which embodiments of the technology disclosed herein can be implemented.

FIG. 5 illustrates another example environment 500 in which embodiments of the technology disclosed herein can be implemented. This example environment 500 provides racks 502a, 502b with customized connection topologies in accordance with embodiments of the technology disclosed herein. Stated differently, FIG. 5 shows the arrangement of optical connections that connect separate enclosures (i.e., inter-enclosure connection) within each rack 502a, 502b.

Each rack 502a, 502b contains enclosures 550a-550h comprising a plurality of articulating arm assemblies 140, 150 disposed therein (as described in FIG. 1). Articulating arm assemblies 140, 150 may be installed on one side (as shown in FIG. 5) or both sides (as will be shown in later figures) on the rear portion of enclosures 550a-550h. Each articulating arm assembly includes an associated side plenum, plenum pivot, arm plenum, and knuckle housing and corresponds to respective enclosures 550a-550h within first rack 502a and second rack 502b. Specifically, in first rack 502a, enclosure 550a corresponds to arm plenum 522a, enclosure 550b corresponds to arm plenum 529b, enclosure 550c corresponds to arm plenum 529c, and enclosure 550d corresponds to arm plenum 532d. Arm plenums 522a, 532d comprise a connector end with first knuckle housing 124 and second knuckle housing 134, respectively. Arm plenums 529b, 529c comprise a first connector end with first knuckle housing 124 and a second connector end with second knuckle housing 134. In second rack 502b, enclosure 550e corresponds to arm plenum 522e, enclosure 550f corresponds to arm plenum 532f, enclosure 550g corresponds to arm plenum 522g, and enclosure 550h corresponds to arm plenum 532h. Arm plenums 522e, 522g comprise a connector end with first knuckle housing 124 and arm plenums 532f, 532h comprise a connector end with second knuckle housing 134. The enclosures 550a-h can be interconnected by knuckle housings 124, 134 "fist-bumping" with each other. First knuckle housing 124 (upper fist) may initiate a "bump" or blindmate with second knuckle housing 134 (lower fist) to form a mated knuckle housing 568. Mated knuckle housing 568 is an integration of the connectors of first 124 and second knuckle housing 134 such that an optical connector of first knuckle housing 124 engages with a complementary optical connector of second knuckle housing 134 or vice versa. Thus, mated knuckles of mated knuckle housing 568 can generate a pseudo rack-plane establishing optical connections between enclosures.

In FIG. 5, a plurality of mated knuckle housings 568 demonstrate a cascading configuration within first rack 502a. Here, the cascading configuration can optically connect enclosures 550a, 550b, 550c, and 550d and give rise to a rack-plane. Specifically, nodes in enclosures 550a-550d are interconnected or coupled with each other. In this way, the fist bump blindmate mechanisms provide high-density fiber/connector methods that may be used in custom and standard rack sizes. The cascading fist-bump connections allow rack-scale connectivity with customizable fiber topologies in the protected environment formed within interconnect trays, fiber boots, side-plenums, arm plenums, plenum pivots, and knuckle housings.

Second rack 502b also comprises a plurality of enclosures 550e, 550f, 550g, and 550h. However, second rack 502b demonstrates an alternative configuration of articulating arm assemblies 140, 150 resulting in a different connection topology. Contrasting with first rack 502a, two sets of adjacent enclosures are coupled in rack 502b as opposed to a cascaded connection of adjacent enclosures 550a-550d in rack 502a. As shown, a first set 550e-f and a second set 550g-h of enclosures are connected via the example fist-bump blindmate mechanisms illustrated in FIGS. 2-4. As such, the varying connectivity of first rack 502a and second rack 502b provides an exemplary example of customizable fiber topologies in accordance with embodiments of the present disclosure.

The features of each rack 502a, 502b are modular and can be implemented in standard racks with limited space as well as custom racks to support a large number of fibers at rack-scale. Moreover since articulating arm assemblies can be disposed on one side or both sides on the rear portion of enclosures, number of fiber connections can be scaled flexibly, and ease of access to trays and components on the rear of enclosure can be improved. Furthermore, elements of the present disclosure can enable faster deployment, denser fiber, lower cost, and lower optical signal loss via all-to-all connectivity of a large number of fabric ports among arrays of compute notes directly through fiber trays and/or indirectly through switch trays in multiple enclosures in a rack. Thus, multiple enclosures within racks can be interconnected in an improved manner, displacing existing methods used to provide complex connectivity (e.g., optical fiber shuffles, patch panels, or other devices within and/or outside the rack). These methods incur considerable expense, space, and time for implementation. The present disclosure avoids these hurdles via the interaction of articulating arm assemblies (e.g., 140, 150 in FIG. 1) within racks.

Figure 6:
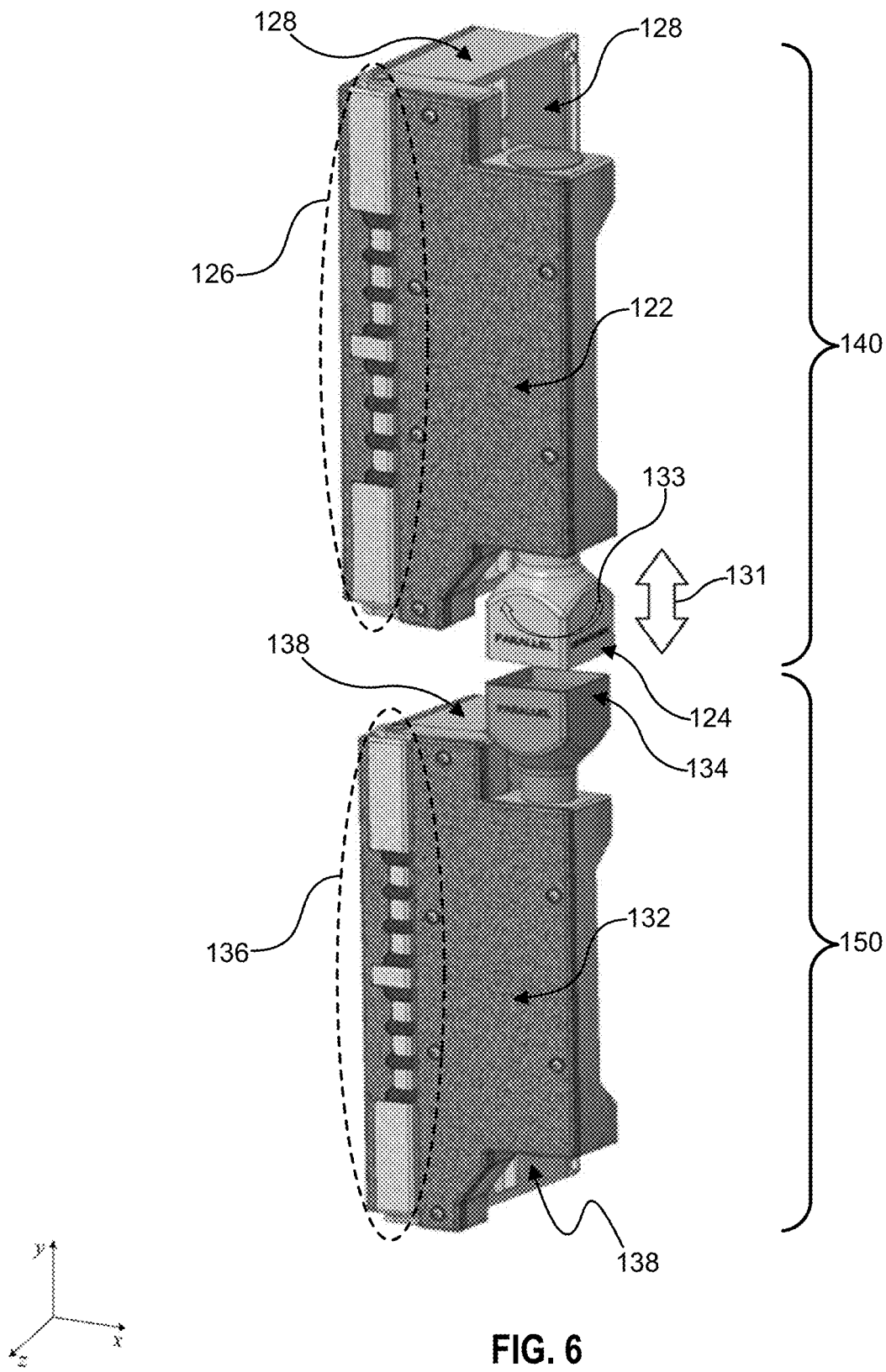
FIG. 6 is a perspective view of example upper and lower articulating arm assemblies in accordance with embodiments of the technology disclosed herein.

FIG. 6 is a non-limiting example 600 of a fist-bump blindmate mechanisms in accordance with various embodiments. FIG. 6 shows a first articulating arm assembly 140 (upper assembly) and a second articulating arm assembly 150 (lower assembly) in an aligned position (e.g., second position illustrated in FIGS. 2B and 2C). First arm assembly 140 may comprise first side plenum 128, first plenum pivot 126, first arm plenum 122, and first knuckle housing 124. Second arm assembly 150 may comprise second side plenum 138, second plenum pivot 136, second arm plenum 132, and second knuckle housing 134. In response to alignment of first knuckle housing 124 and second knuckle housing 134 (i.e., position illustrated in FIG. 6) first knuckle housing 124 (upper fist) can be configured to translate (i.e., slide up or down) in a vertical direction 131 (along the y-axis) to engage second knuckle housing 134 (lower fist). First knuckle housing 124 can also be configured to rotatable about itself along the direction 133. Rotation of first knuckle housing 124 can change the orientation of an optical connector disposed within first knuckle housing 124. In a first orientation of the optical connector, engagement of first knuckle housing 124 with second knuckle housing 134 provides an in-line blindmate connection. On the other hand, in a second orientation of the optical connector, engagement provides an orthogonal blindmate connection. In this non-limiting example, second knuckle housing 134 comprises an optical connector that is complementary to the optical connector of first knuckle housing 124. As such, the orientation of the optical connector of second knuckle housing 134 is dependent on the orientation of the optical connector of first knuckle housing 124. Additionally, unlike first knuckle housing 124, second knuckle housing 134 is not configured to be rotatable about itself. That is, second knuckle housing 134 is stationary during translation of first knuckle housing 124. As such, second knuckle housing 134 provides a stable and complementary dock for first knuckle housing 124. For this example, the first knuckle housing 124 and the second knuckle housing 134 as well as the corresponding optical connectors within these housings are organized in a square so that the housings 124, 134 can be mated in either in-line or in rotated orientation for different application configurations. In one non-limiting example, the optical connector of first knuckle housing 124 comprises a plug and the optical connector of second knuckle housing 134 comprises a receptacle. During translation of first knuckle housing 124, the plug of first knuckle housing 124 is inserted into the receptacle of second knuckle housing 134 such that a robust optical connection is formed. In other embodiments, features of the particular optical connectors are applicable to each knuckle housing 124, 134.

FIG. 7A is a closer view of an example embodiment of a first knuckle housing or upper fist in accordance with the embodiments of the technology disclosed herein. In FIG. 7A, first knuckle housing (upper fist) 124 of first arm assembly 140 comprises an optical connector array 125. Walls 124a-124d of upper first 124 may be inserted within the walls 134a-134d of lower fist 134. Additionally, optical connector array 125 may be disposed on a side of upper fist 124 opposite a side coupled to first arm plenum 122. Optical connector array 125 may also be interchangeably coupled to upper fist 124 enabling removal and/or replacement.

FIG. 7B is a closer view of an example embodiment of a second knuckle housing or lower fist in accordance with the embodiments of the technology disclosed herein. In FIG. 7B, second knuckle housing (lower fist) 134 of second arm assembly 150 comprises an optical connector array 135 that is complementary to optical connector array 125. Walls 134a-134d of upper fist 134 may receive walls 124a-124d of upper fist 134. Further, optical connector array 135 may be disposed on a side of lower fist 134 opposite a side coupled to second arm plenum 132. Optical connector array 135 can be interchangeably coupled to lower fist 134 so as to accommodate removal and/or replacement. In various embodiments, each fist 124, 134 may be "narrow" to hold respective optical connector arrays 125, 135 and have a substantially square shape.

Optical connector arrays 125, 135 may comprise a ferrule carrier that can be configured in a serial or a parallel ferrule orientation. In other embodiments, the optical connector arrays 125, 135 may comprise duplex and/or parallel fiber ferrules. Using a reconfigurable optical ferrule carrier adapter, a plurality of ferrule carriers can be coupled in a number of different configurations, allowing for in-line or orthogonal mating of reconfigurable optical ferrule carriers to provide all-to-all connectivity. Reconfigurable optical ferrule carrier adapters may also include alignment and engagement features further described in U.S. patent application Ser. No. 16/362,464 to Leigh et al. and titled "RECONFIGURABLE OPTICAL FERRULE CARRIER MATING SYSTEM" and filed on Mar. 22, 2019 and incorporated herein by reference in its entirely. Optical connector array 135 may comprise a ferrule carrier that can be configured in a serial or a parallel ferrule orientation. Optical connector array 135 comprises features 134a-134d that can facilitate alignment and engagement to an optical connector array 125 of first knuckle housing 124.

Figure 8A:
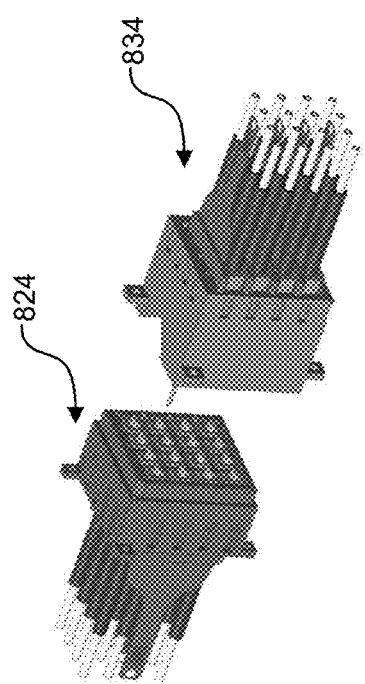
FIG. 8A is a perspective view of an example first blindmate connector and an example second blindmate connector in accordance with the embodiments of the technology disclosed herein.
Figure 8B:
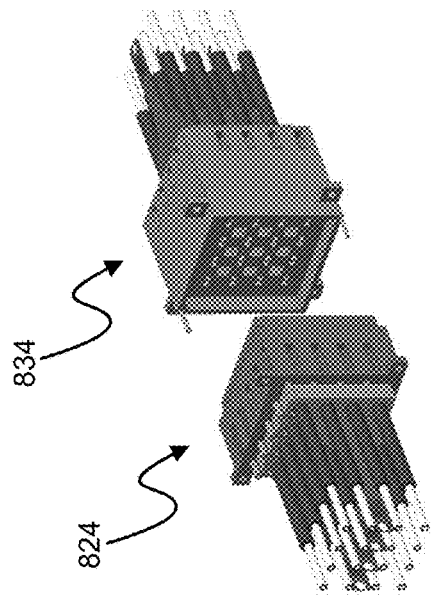
FIG. 8B is an alternative perspective view of the example first blindmate connector and the example second blindmate connector illustrated in FIG. 8A.

FIGS. 8A and 8B provide perspective views of an example first blindmate connector and an example second blindmate connector in accordance with the embodiments of the technology disclosed herein. In at least one embodiment, first and second knuckle housing 124, 134 may include a first blindmate connector 824 and a second blindmate connector 834 comprising reconfigurable optical ferrule (ROF) carriers incorporated in knuckle housings of articulating arm assemblies 140, 150. Knuckle housings 124, 134 may be implemented as either a ROF blindmate receptacle 834 or a ROF blindmate plug 824 and be configured to complement one another.

Figure 8C:
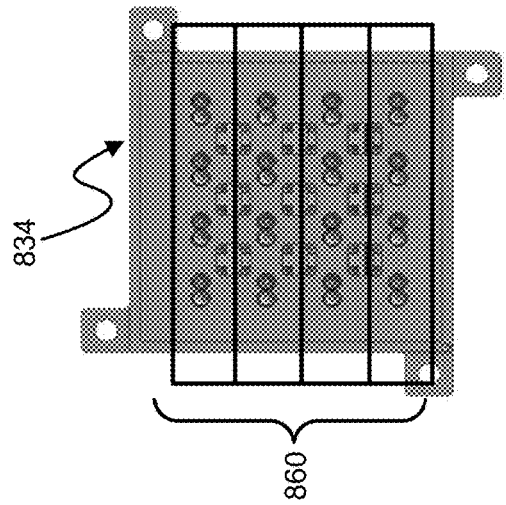
FIG. 8C is a top view of a carrier of the example first blindmate connector illustrated in FIGS. 8A and 8B.
Figure 8D:
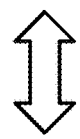
FIG. 8D is a top view of a carrier of the example second blindmate connector illustrated in FIGS. 8A and 8B.

FIG. 8C is a top view of each carrier of the example second knuckle housing connector 834 and the example first knuckle housing connector 824 illustrated in FIGS. 8A and 8B. The ROF carriers 850, 860 (e.g., containing a plurality of ferrules) can be inserted into respective ROF carrier adapters to secure the orientation for orthogonal mating and all-to-all connectivity. The ROF carriers may also be rotated to achieve different configurations and their corresponding connectivity. In one non-limiting example, duplex ferrules can be used in wide-knuckle mechanism to hold a greater number of ferrules. For example, duplex ferrules may be blindmated which is further described in co-owned U.S. patent application Ser. No. 16/362,464 to Leigh et al. (Inventor) and titled "RECONFIGURABLE OPTICAL FERRULE CARRIER MATING SYSTEM" and filed on Mar. 22, 2019 and incorporated herein by reference in its entirety. The '464 patent application describes a duplex ferrule housing holding two ferrules and having a rib for ferrule orientation. A combination of a ferrule carrier (e.g., Serial Ferrule Carrier and Parallel Ferrule Carrier) and a ferrule carrier adapter provide improved mechanical alignment and retention features. For example, this combination retains, aligns, and keys multiple duplex ferrule housings. The two fiber ferrule types included may be incorporated in the fist-bump blindmating mechanism described in the instant disclosure. However, other fiber ferrule types may also be used instead of or in addition to the '464 patent application ferrule types.

FIGS. 9A-9C show movements 900 performed by upper fist 124 of first arm plenum 122 when in a closed and engaged position (e.g., third position in FIGS. 2C and 3C). FIG. 9A illustrates a lengthwise cross-section of FIG. 6 and FIG. 9B illustrates a closer view of FIG. 9A. FIG. 9A is a cross-section of first side plenum 128, arm plenum 122, and first knuckle housing 124 illustrating details regarding an example fist-bump blindmate mechanism. The mechanism is conceptually analogous to a fist-bump between two individuals. For example, first side plenum 128 is like an upper arm, first plenum pivot 126 is like an elbow joint, arm plenum 122 is like a lower arm or forearm, and first knuckle housing 124 is like a fist. Basically, two people rotate respective elbow joints to align their forearms and make vertical fist contact. The fist-bump blindmate mechanism of the present disclosure conceptually resembles these series of movements. After the arm plenum 122 pivots about the side plenum 128, the upper fist 124 translates or slides into the lower fist 134 as shown in FIG. 9C (e.g., third position in FIGS. 2C and 3C). FIG. 9C illustrates a mated upper fist 124 of upper arm assembly 140 and lower fist 134 of lower arm assembly 150 in FIG. 6. The upper fist 124 can also be rotated about an axis of rotation A-A to create a desired connector configuration. For example, in-line or orthogonal mating knuckle 968 configurations. Specifically, rotation of upper fist 124 provides an orthogonal mating configuration and no rotation of upper fist 124 provides an in-line configuration via mated knuckle housing 968.

In various embodiments, first and second knuckle housing 124, 134 may include further user-friendly features glued on or etched, such as knuckle labels or tags 111a, 111b, 121. Knuckle labels 111a, 111b, 121 may identify a type of blindmating and/or an orientation of the optical array connector of each knuckle housing 124, 134. Identification tags 111a, 111b, 121 aid in identifying an optical connector array orientation before and after rotation of first knuckle housing 124. Identification labels 111a, 111b, 121 may also confirm a desired optical connector array configuration is achieved. Thus, an orientation or status of each knuckle housing 124, 134 can be identified with just a glance. Further embodiments of identification labels 111a, 111b, 121 include corresponding colors, colored icons, symbols, and/or words that identify a type of connectivity such as in-line or orthogonal blindmating. In-line blindmating may indicate some-to-some connectivity while orthogonal blindmating can indicate all-to-all connectivity. In FIG. 9C, knuckle label 111a indicates optical connector array(s) of first knuckle housing 124 is "PARALLEL" to optical connector array(s) of second knuckle housing 134. Likewise, knuckle label 121 indicates optical connector array(s) of second knuckle housing 134 is to the optical connector array(s) of first knuckle housing 124. As such, in-line blindmating is shown in FIG. 9C. As discussed above, first knuckle housing 124 can be configured to rotate about itself. Upon rotation of first knuckle housing 124, knuckle label 111b indicates "ORTHOGO- NAL" and second knuckle housing 134 continues to indicate "PARALLEL." Different knuckle labels 111b, 121 signifies optical connector array(s) are orthogonal to each other. Another non-limiting example provides "IN-LINE" in first knuckle housing 124 and "ORTHOGONAL" in first knuckle housing 124 (illustrated in FIGS. 10A-10D). It is understood that other identification labels or tags may be used in addition to or instead or these examples.

FIGS. 10A-10D show example retention features for in-line and orthogonal blindmating in accordance with embodiments of the technology disclosed herein. Knuckle housings 124, 134 are square shape for the mating ends, i.e., they have same dimension on each side so that they can be mated in-line or orthogonal. Additional embodiments will be described later that will be referred to as "wide" knuckles, since those knuckle housings have a larger dimension on one side than the other side. Therefore, the embodiments described in FIGS. 10A-10D will be referred to as "narrow" knuckles. FIGS. 10A and 10B is an example implementation of in-line fist-bump blindmating with narrow-knuckle retention features in accordance with embodiments of the technology disclosed herein. FIG. 10A is a side view of example narrow-knuckle retention features disposed on first knuckle housing 124 and second knuckle housing 134 aligned with each other for in-line blindmating 1010. Narrow-knuckle retention features comprise a first narrow-knuckle retention feature 1039 and a second narrow-knuckle retention feature 1049. First narrow-knuckle retention feature 1039 is disposed on second knuckle housing 134 while second narrow-knuckle retention feature 1049 includes a top unit disposed on first knuckle housing 124 and a bottom unit disposed on second knuckle housing 134. To facilitate mating, second knuckle housing 134 can further comprise a receptacle formed by sidewalls 134a-134d enabling first knuckle housing 124 to dock. In response to first knuckle housing 124 docking with second knuckle housing 134, first narrow-knuckle retention feature 1039 cooperates with second narrow-knuckle retention feature 1049 to lock first knuckle housing 124 and second knuckle housing 134 together.

FIG. 10B illustrates first knuckle housing 124 engaging with second knuckle housing 134 and activation of narrow-knuckle retention features 1039, 1049 illustrated in FIG. 10A. As shown, vertical movement (along y-axis) of first knuckle housing 124 causes first narrow-knuckle feature 1039 disposed on second knuckle housing 134 to be activated. Concurrently, the top unit of second narrow-knuckle retention feature 1049 disposed on first knuckle housing 124 contacts the bottom unit of second narrow-knuckle retention feature 1049 disposed on second knuckle housing 134 to interlock first 124 and second knuckle housing 134. First narrow-knuckle retention feature 1039 and second narrow-knuckle retention feature 1049 cooperate to form the in-line blindmate connection 1010.

FIGS. 10C and 10D is an example implementation of orthogonal fist-bump blindmating with narrow knuckle retention features in accordance with embodiments of the technology disclosed herein.

FIG. 10C is a side view of example knuckle retention features 1049, 1059 in accordance with embodiments of the technology disclosed herein. FIG. 10C shows first knuckle housing 124 and second knuckle housing 134 previously in alignment (i.e., moved to second position) for subsequent mating. To achieve a desired optical orientation, first knuckle housing 124 may be rotated along the direction 133 as shown in FIG. 10C. Upon rotation, first knuckle housing 124 may be moved in a vertical direction 131 (along y-axis) to contact second knuckle housing 134. Although FIG. 10D shows first knuckle housing 124 rotated 90 degrees from the alignment illustrated in FIG. 10B, the operation is not different. As illustrated, in response to contact between first knuckle housing 124 and second knuckle housing 134, second narrow-knuckle retention feature 1049 cooperates with a third narrow-knuckle retention feature 1059 to lock first knuckle housing 124 and second knuckle housing 134. In some embodiments, second knuckle housing 134 does not slide or rotate during in-line blindmating 1010 and orthogonal blindmating 1020. In one non-limiting example, second knuckle housing 134 can have a receptacle to allow a dock for first knuckle housing 124.

FIG. 10D illustrates first knuckle housing 124 engaging with second knuckle housing 134 and activation of narrow-knuckle retention features 1049, 1059 illustrated in FIG. 10C.

As previously described with reference to FIG. 9C, various embodiments of knuckle housings 124, 134 may further include identification labels 111, 121. In the embodiment of FIGS. 10A and 10B, an in-line blindmating connection can be explicitly indicated by matching labels 111a, 121 on first knuckle housing 124 and second knuckle housing 134, respectively. For example, label 111a reads "IN-LINE" and label 121 reads "IN-LINE." On the other hand, in the embodiment of FIGS. 10C and 10D, an orthogonal blindmating connection can be explicitly indicated by label 111b on first knuckle housing 124 and label 121 on second knuckle housing 134 not matching with each other. For example, label 111b reads "ORTHOGONAL" and label 121 reads "IN-LINE."

FIG. 11A illustrates example articulating arm assemblies in an open position and a closed position of the example racks 502a, 502b illustrated in FIG. 5. As illustrated, first side plenum 128 is coupled with first plenum pivot 126 of arm plenum 122. Second side plenum 138 is coupled with second plenum pivot 136 of arm plenum 132. An open position 513 is shown in the top half of FIGS. 11A and 11B in which network devices within each enclosure may undergo installation, removal, and/or maintenance. Each enclosure within rack 502a and rack 502b may independently move from an open position to a closed position or vice versa. That is, some optical connections may be maintained when other enclosures are in an uncoupled position or open during servicing. A closed position 523 is shown in the bottom half of FIGS. 11A and 11B in which network devices within each enclosure may be connected via articulating arm assembles 140, 150.

FIG. 11B illustrates another view of the articulating arm assemblies in an open position and a closed position of the example racks 502a, 502b illustrated in FIG. 5. In the open position 513, side plenums 128, 138, plenum pivots 126, 136, and arm plenums 122, 132 are configured to be approximately coplanar. As shown, each enclosure is easily assessable for installation and/or servicing of cable trays or switch trays. On the other hand, upon rotation of each arm plenum 122, 132 to the closed position 523, side plenums 128, 138 and plenum pivots 126, 136 maintain alignment with each other while arm plenums 122, 132 are substantially perpendicular to corresponding side plenums 128, 138 and plenum pivots 126, 136.

Figure 12A:
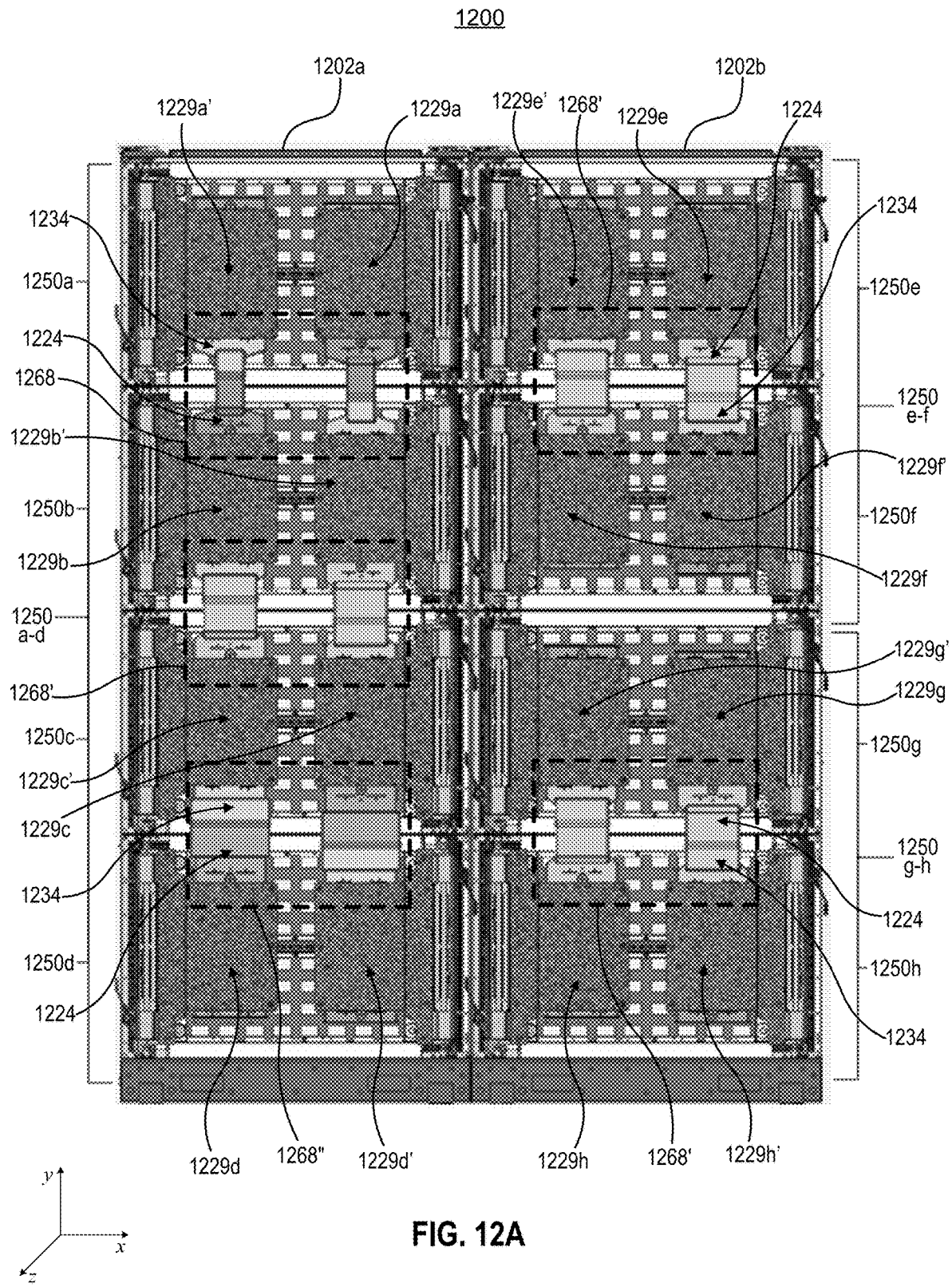
FIG. 12A shows a rear view of an example wide articulating arm assembly in accordance embodiments of the technology disclosed herein.

FIG. 12A illustrates an alternative embodiment of the articulating arm assemblies on both sides in each rack in accordance with embodiments of the technology disclosed herein. With reference to FIG. 12A, similar to FIG. 5, the articulating arm assemblies are in a coupled or closed position within each enclosure. A first wide-knuckle housing 1224 is like first narrow-knuckle housing 124 in that it may include a sliding or moving knuckle. A second wide-knuckle housing 1234 is like a second narrow-knuckle housing 134 in that it may include a static knuckle. Dissimilar to the embodiments illustrated in FIGS. 1-11, arm plenums 1229 comprise both a sliding knuckle and a static knuckle with a combination of knuckle housings. Additionally, example environment 1200 of FIG. 12 comprises a greater number of optical connections and arm plenums can be configured to be extended over the entirety of each enclosure 1250a-1250d. As such, improved customization regarding the arrangement and number of optical connections can be achieved. Essentially, each enclosure has a set of arm plenums and each arm plenum can be opened or closed in accordance with the design of the desired implementation. In FIG. 12A, a first rack 1202a encompasses four enclosures, 1250a, 1250b, 1250c, and 1250d. The four enclosures are coupled and provide a cascading connection similar to the configuration in FIG. 5. A second rack 1202b encompasses four enclosures, 1250e, 1250f, 1250g, and 1250h. Two sets of the four enclosures are coupled, 1250e-f and 1250 g-h. Thus, FIG. 12A provides a non-limiting example of different fiber topologies within racks.

FIG. 12A also shows a first wide-knuckle housing engaged with a second wide-knuckle housing to establish a mated knuckle housing 1268 (i.e., mated knuckles). In this example, the knuckles are deemed "wide" because they hold more optical connectors than the embodiments disclosed with respect to FIGS. 1-11. The width of wide-knuckle housings can also provide additional possibilities for configurations of optical connector arrays within each wide-knuckle housing. As a non-limiting example, a first configuration of mated knuckles 1268 provides a specified number of optical connections. A second configuration of mated knuckles 1268' provides a greater number of optical connections relative to the first configuration. And a third configuration of mated knuckles 1268" provides a greater number of optical connections relative to the second configuration. Accordingly, numerous customizable optical connections are possible with the embodiment illustrated in FIG. 12A.

Each articulating arm assembly includes an associated side plenum, plenum pivot, arm plenum, and knuckle housing and corresponds to respective enclosures 1250a-1250h within first rack 1202a and second rack 1202b. Specifically, in first rack 1202a, enclosure 1250a corresponds to arm plenums 1229a and 1229a', enclosure 1250b corresponds to arm plenums 1229b and 1229b', enclosure 1250c corresponds to arm plenums 1229c and 1229c', and enclosure 1250d corresponds to arm plenums 1229d and 1229d'. Arm plenums 1229a-1229d and 1229a'-1229d' can comprise a first connector end with first knuckle housing 1224 and a second connector end with second knuckle housing 1234. Furthermore, arm plenums 1229a-1229d comprise knuckle housing locations that can be disposed opposite to knuckle housing locations in arm plenums 1229a'-1229d'. That is, the location of knuckle housings in arm plenums 1229a-1229d are the reciprocal of the location of knuckle housing 1224, 1234 in arm plenum 1229a'-1229d' and vice versa. For example, knuckle housings 1224, 1234 of arm plenum 1229a' and knuckle housings 1224, 1234 of arm plenum 1229b are disposed at opposite ends relative to each other. In other embodiments, arm plenums associated with the same enclosure such as arm plenum 1229a' and arm plenum 1229a may include knuckle housings 1224, 1234 disposed at opposite ends relative to each other. Furthermore, arm plenums of articulating arm assemblies that are associated with the same enclosure may move independently of each other or as a unit between open position 1223 and closed position 1213. In at least one embodiment, knuckle housings 1224, 1234 disposed on arm plenums may not be reciprocal to each other but comprise at least one knuckle housing 1224, 1234 that is complementary to a knuckle housing 1224, 1234 associated with an adjacent enclosure (i.e., enclosures stacked along the y-axis).

In second rack 1202b, enclosure 1250e corresponds to arm plenums 1229e and 1229e', enclosure 1250f corresponds to arm plenums 1229f and 1229f', enclosure 1250g corresponds to arm plenums 1229g and 1229g', and enclosure 1250h corresponds to arm plenums 1229h and 1229h'. Arm plenums 1229e-1229h and 1229e'-1229h' can comprise a first connector end with first knuckle housing 1224 and a second connector end with second knuckle housing 1234. Additionally, arm plenums 1229e-1229h comprise knuckle housing locations that are opposite or reciprocal to knuckle housing locations associated with arm plenums 1229e'-1229h' and vice versa. The enclosures 1250a-h can be interconnected by knuckle housings 1224, 1234 "fist-bumping" with each other. First knuckle housing 1224 (upper fist) may initiate a "bump" or blindmate with second knuckle housing 1234 (lower fist) to form mated knuckle housing 1268. Mated knuckle housing 1268 is an integration of the front ends or connector ends of first 1224 and second knuckle housing 1234 such that an optical connector of first knuckle housing 1224 engages with a complementary optical connector of second knuckle housing 1234 or vice versa. Thus, the mated knuckles of mated knuckle housing 1268 can generate a pseudo rack-plane to establish dynamic optical connections between enclosures.

FIG. 12B illustrates example articulating arm assemblies in an open position and a closed position in accordance with embodiments of the technology disclosed herein. First knuckle housing 1224 and second knuckle housing 1234 are each coupled to an arm plenum 1229, 1229' that articulates about first plenum pivot 1226 and a second plenum pivot 1236, respectively. First knuckle housing 1224 engages and retracts from second knuckle housing 1234 similar to the interaction between first knuckle housing 124 and second knuckle housing 134. Also, second knuckle housing 1234 can be configured to be static like second knuckle housing 134. Nevertheless, the features of first knuckle housing 1224 (i.e., movement) can be applicable to second knuckle housing 1234 and vice versa. Like FIG. 5, arm plenums 1229, 1229' may comprise a knuckle housing at one connector end (not illustrated), or both connector ends. Additionally, one connector end may form a connection or both connector ends may form a connection depending on the configuration of the rack. In rack 1202a of FIG. 12B, a closed position 1213 is illustrated between adjacent enclosures 1250a and 1250b (shown in FIG. 12A) while arm plenums 1229a', 1229b are within rack 1202a (e.g., rack door is closed) and aligned. While, in rack 1202b, an open position 1223 demonstrates the ability to install, repair, and service components within enclosures that would be covered in a closed position 1213. Open position 1223 may further provide coupling between adjacent enclosures 1250g and 1250h when arm plenums 1229g, 1229h' are aligned. The plenum pivots 1226, 1236 enable each arm plenum to be pivoted to closed position 1223 within each enclosure or open position 1213 outside each enclosure as shown in FIGS. 12B and 12C. First plenum 1226 and second plenum pivot 1236 can share substantially the same construction and hereinafter referred to as plenum pivot 1246. In the same way, first side plenum 1228 and second side plenum 1238 are hereinafter referred to side plenum 1240.

FIG. 12C illustrates another view of example articulating arm assemblies in the open position and the closed position in accordance with embodiments of the technology disclosed herein. As shown, all enclosures in rack 1202a are in closed position 1213 and all enclosures in rack 1202b are in open position 1223. FIG. 12C, like FIG. 4, demonstrates that knuckle housings 1224, 1234 may be mated when the associated arm plenums 1229, 1229' are in the closed 1213 or open position 1223 so long as the associated arm plenums 1229, 1229' are aligned. For example, the enclosures in rack 1202a are communicatively coupled in the closed position 1213 while enclosures in rack 1202b are communicatively coupled in the open position 1223. FIG. 12C also explicitly illustrates a connection 1223 or pseudo rack-plane that can be formed while articulating arm assemblies are in open position 1223. Thus, even when access to interconnect trays 101 or components within trays 101 (e.g., power supply and fan units) is needed for servicing or replacement, connection 1223 is not interrupted by moving mated knuckle housings 1268, 1268', 1268" of associated articulating arm assemblies to an open position.

FIGS. 12D-12G show various views of an example wide articulating arm assembly in accordance with embodiments of the technology disclosed herein. As illustrated, a side plenum 1240 is coupled to an arm plenum 1229 via a plenum pivot 1246. In this non-limiting example, arm plenum 1229 comprises a knuckle housing 1224, 1234 at each connector end. Other examples may comprise a knuckle housing 1224, 1234 at a single connector end. The number of connector ends will depend on the position of each articulating arm assembly and the configuration of an associated rack. Arm plenum 1229 may be pivoted to be rotated by moving in the horizontal direction (along the x-axis) from open position 1223 to closed position 1213 or vice versa.

FIG. 12D shows a back-hand view and 12F shows a palm-side view of an example upper/lower wide articulating arm assembly in an open position. These views show an articulating arm assembly in isolation while FIGS. 12A-12C provide articulating arm assemblies installed within enclosures 1250a-h of racks 1202a, 1202b. In FIGS. 12B and 12C, all articulating arm assemblies of rack 1202b are in open position 1223 and thus correspond to the open position illustrated in FIGS. 12D and 12F.

On the other hand, FIG. 12E shows a back-hand view and FIG. 12G shows a palm-side view of an example upper/lower wide articulating arm assembly in a closed position. These view shows an articulating arm assembly in isolation while FIGS. 12A-12C provide articulating arm assemblies installed within enclosures 1250a-h of racks 1202a, 1202b. In FIGS. 12B and 12C, all articulating arm assemblies of rack 1202a are in closed position 1213 and thus correspond to the closed position illustrated in FIGS. 12E and 12G.

In one non-limiting example, the dimensions of the side plenum may be 17 inches tall (L1) and the arm plenum may be 12 inches tall (L2). Also with the cover of the side plenum removed there may be 12 inches of working space for routing optical fibers and cables. As far as width, the side plenum may be 8 inches wide (W1) and the arm plenum may be 11 inches wide (W2). Side plenums and arm plenums may have covers on one side or both sides for fiber routing. Each cover on a front and/or back of each side plenum and each arm plenum may be removed to enable ease of fiber routing. For example, each narrow or wide articulating arm assembly can comprise one or more removable covers modularly coupled or interchangeably attached to various surfaces of the side plenums, arm plenums, and side plenum extensions. The surfaces of at least the side plenums and arm plenums may include front, back, rear, back-hand side, palm-hand side, top, bottom, and/or lateral surfaces. In one embodiment, covers on the back and front surfaces of arm plenums and side plenums may be removed for cleaning, maintenance, or make fiber routing less cumbersome. The covers can be replaced or reattached after installation of various optical components that may guide optical signals and/or transmit light. Some optical components include optical waveguides, optical cables (i.e., a fiber, multiple fibers, or fiber bundle in a structure), optical cable assemblies, and/or optical fibers. Accordingly, the cost and time spent during installation and servicing of the optical components as well as the inner workings of each articulating arm assembly may be reduced.

FIGS. 13A-13C show an example implementation of fist-bump blindmating with a second knuckle retention feature in accordance with embodiments of the technology disclosed herein. FIG. 13A shows an example motion of second knuckle retention feature 1339 on first knuckle housing 1224 to maintain engagement with second knuckle housing 1234. As shown in FIG. 13A, in response to first knuckle housing 1224 translating a distance in the vertical direction (along the y-axis) to blindmate or "fist-bump" second knuckle housing 1234, second knuckle retention feature 1339 is configured to latch first knuckle housing 1224 to second knuckle housing 1224. In some embodiments, second knuckle retention feature comprises a spring plunger (not shown) that is mounted to surfaces of first arm plenum 1229 and first knuckle housing 1224. Translation of first knuckle housing 1224 compresses the spring plunger which positions push-button (pin) 1339a, shown in FIG. 13C, into a notched out or recessed area. Thus, the spring plunger locks first knuckle housing 1224 into the engaged position with second knuckle housing 1234, as shown in FIGS. 14C and 14D.

FIG. 13B shows an activated spring plunger retracting first knuckle housing 1224 from second knuckle housing 1234 in accordance with embodiments of the technology disclosed herein. As discussed above, push-button 1339a, shown in FIG. 13C, is primed during engagement with second knuckle housing 1234 and provides a hold-open function. The hold-open function of push-button 1339a can be triggered manually to move the push-button 1339a out of the locking recess. For example, when push-button 1339a is pressed, the spring plunger is released which causes first knuckle housing 1224 to retract into first arm plenum 1229. In some embodiments, the force used to translate first knuckle housing 1224 is stored in a spring plunger and when released this energy is then utilized to return first knuckle housing 1224 to a retracted position. The retracted position may be a distance within the connector end of arm plenum 1229.

Figure 13D:
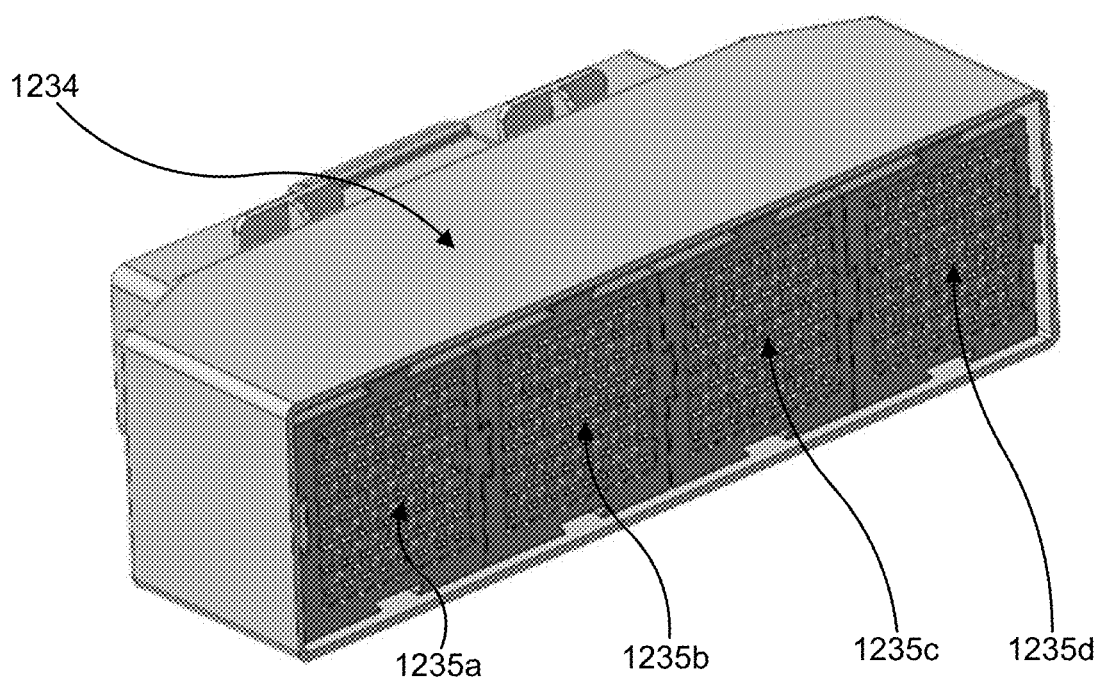
FIG. 13D shows an example configuration for optical connectors in a second knuckle housing in accordance with embodiments of the technology disclosed herein.
Figure 13E:
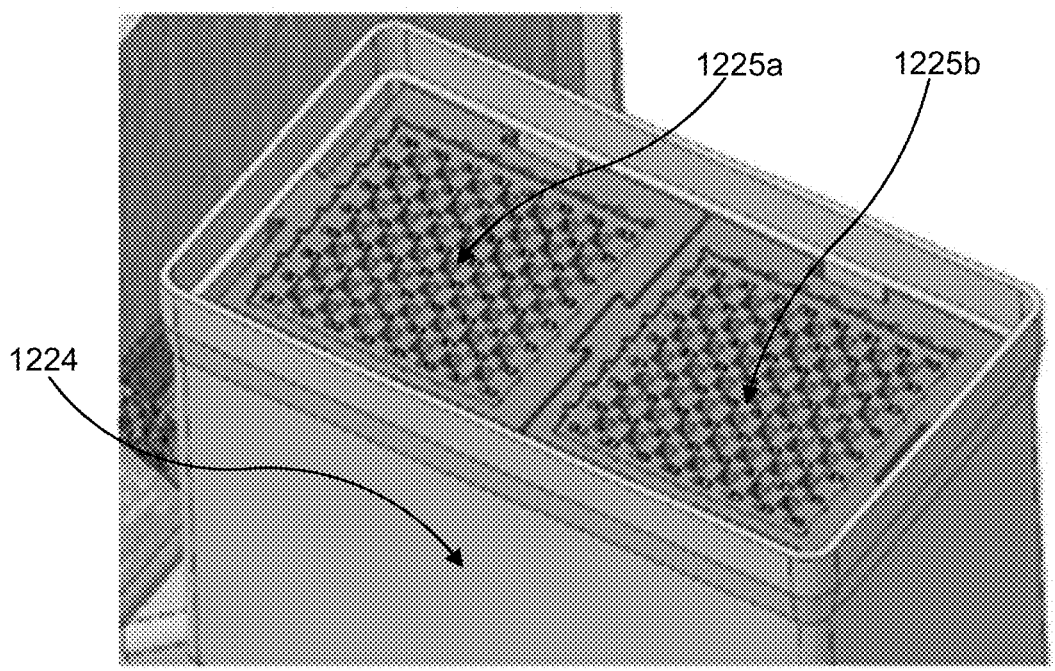
FIG. 13E shows an example configuration for optical connectors in a first knuckle housing in accordance with embodiments of the technology disclosed herein.

FIGS. 13D and 13E show example different configurations for optical connections in accordance with embodiments of the technology disclosed herein. The configurations illustrated are also found in FIG. 16 at various embodiments directed to first knuckle housing 1624 and second knuckle housing 1634. As illustrated, each knuckle housing 1224, 1234 comprises features to mount optical connector arrays. The optical connectors can be installed for pre-defined in-line or orthogonal connectivity configuration. Moreover, the number of optical connectors in the connector arrays within mated knuckle housings 1268, 1268', 1268" (illustrated in FIG. 12A) may vary depending on the application or implementation requirements. In FIG. 13D, the second knuckle housing 1234 includes optical connector arrays 1235a-1235d while first knuckle housing 1224 in FIG. 13E includes optical connector arrays 1225*a*, 1225*b*. Each knuckle housing 1224, 1234 may be "wide" to hold multiple optical connectors and form a substantially rectangular shape. Advantageously, the increased width of wide-knuckle housing embodiments provides greater flexibility when determining the desired number of optical connections between enclosures within a rack.

Figures 14A, 14B:
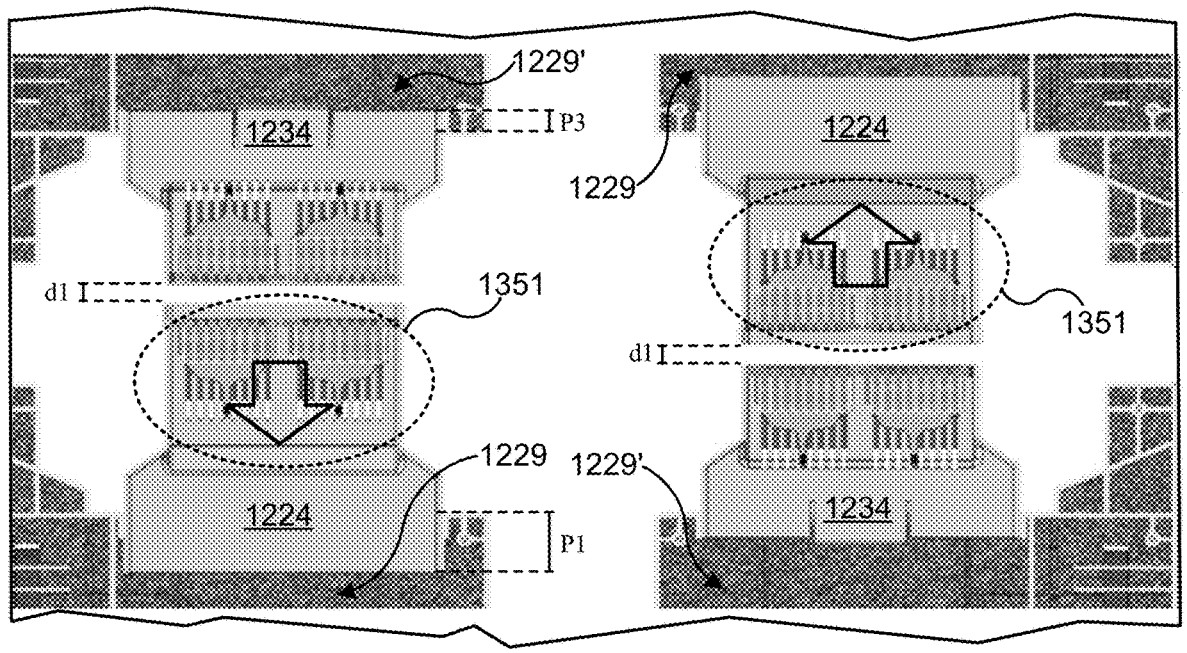
FIG. 14A shows a first position of the second knuckle retention feature in an example second knuckle housing connector and an example first knuckle housing connector in accordance with embodiments of the technology disclosed herein.
FIG. 14B shows a first position of the second knuckle retention feature in an example second knuckle housing connector and an example first knuckle housing connector in accordance with embodiments of the technology disclosed herein.
Figures 14C, 14D:
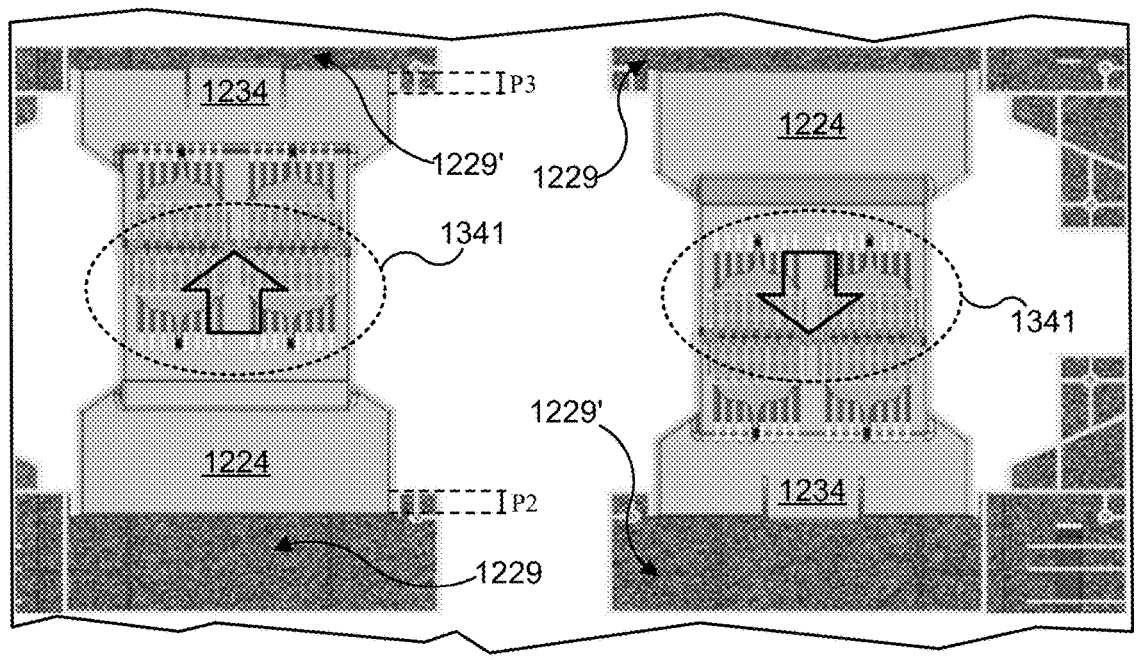
FIG. 14C shows a second position of the second knuckle retention feature in an example second knuckle housing connector and an example first knuckle housing connector in accordance with embodiments of the technology disclosed herein.
FIG. 14D shows a second position of the second knuckle retention feature in an example second knuckle housing connector and an example first knuckle housing connector in accordance with embodiments of the technology disclosed herein.

FIG. 14A shows a first position P1 of the second knuckle retention feature in an example second knuckle housing connector and an example first knuckle housing connector in accordance with embodiments of the technology disclosed herein. That is, FIG. 14A illustrates first knuckle housing 1224 is in a first position P1 after being retracted from second knuckle housing 1234 into arm plenum 1229. The first position P1 is the state of the first knuckle housing 1224 after arm plenum 1229 swings into an aligned position with second knuckle housing 1234. The distance d1 between first knuckle housing 1224 and second knuckle housing 1234 demonstrates a gap can be present between adjacent knuckle housings 1224, 1234. In some embodiments, second knuckle retention feature 1339 of FIGS. 13A-13C may be incorporated in first knuckle housing 1224 and depressing second knuckle retention feature 1339 releases first knuckle housing 1224 from engaged position 1341 to retracted position 1351.

FIG. 14B shows a first position P1 of the second knuckle retention feature in an example second knuckle housing connector and an example first knuckle housing connector in accordance with embodiments of the technology disclosed herein. Second knuckle housing 1234 is configured to be static as shown by P3 in FIG. 14A being substantially the same as P3 in FIG. 14C. As such, second knuckle housing 1234 remains stationary to form a stable receptacle or docking station for first knuckle housing 1224 to be inserted. As illustrated, first knuckle housing 1224 moves to retracted position 1351 partially within first arm plenum 1229 while second knuckle housing 1234 does not change position in regards to second arm plenum 1229'.

FIG. 14C shows a second position P2 of the second knuckle retention feature in an example second knuckle housing connector and an example first knuckle housing connector in accordance with embodiments of the technology disclosed herein. Similar to FIG. 13A, first knuckle housing 1224 is movable in a direction towards second knuckle housing 1234. And translation of first knuckle housing 1224 blindmates or "fist-bumps" second knuckle housing 1234. In some embodiments, second knuckle retention feature 1339 of FIGS. 13A-13C may be incorporated in first knuckle housing 1224 to lock first knuckle housing 1224 and second knuckle housing 1234 in engaged position 1341.

FIG. 14D shows a second position P2 of the second knuckle retention feature in an example second knuckle housing connector and an example first knuckle housing connector in accordance with embodiments of the technology disclosed herein. Like FIG. 14B, second knuckle housing 1234 does not move to meet movable first knuckle housing 1224 in engaged position 1351 (shown by static P3 reference identifier). Instead, second knuckle housing 1234 acts as a docking station for first knuckle housing 1224 to achieve a stable connection.

Figure 15:
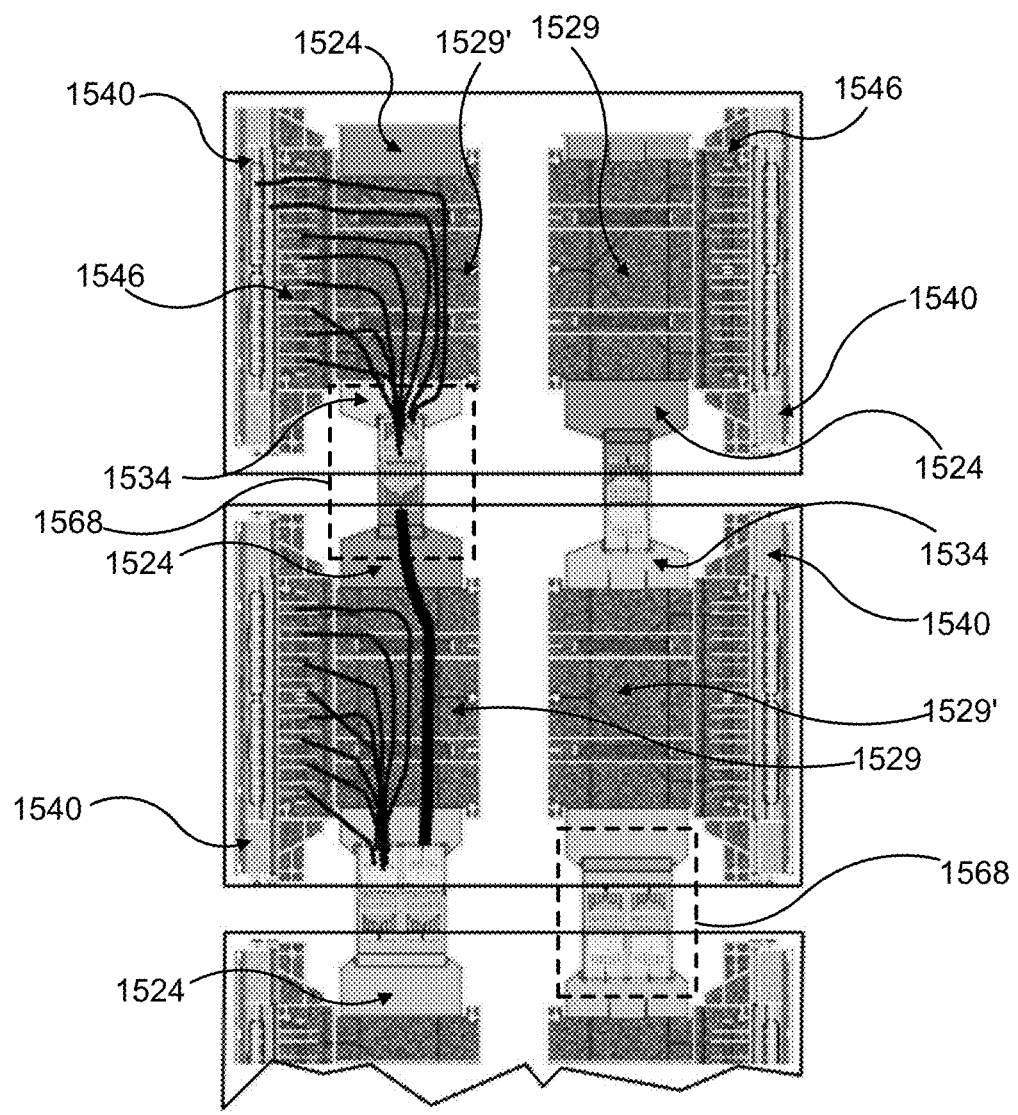
FIG. 15 shows an example routing of wires implementation in example wide articulating arm assemblies in accordance with embodiments of the technology disclosed herein.

FIG. 15 shows an example routing of fibers implementation 1500 in an example articulating arm assembly in accordance with embodiments of the technology disclosed herein. In FIG. 15, individual optical cable bundles or fibers may be directed routed into side plenums 1540, plenum pivots 1546, and then to knuckle housings 1524, 1534 via arm plenums 1529. Alternatively, fibers may be directly routed or shuffled within side plenums 1540 or arm plenums 1529. Thus, various schemes may be implemented to establish fiber routes and eventual connections through mated knuckle housings 1568. Moreover, as described in reference to the construction of articulating arm assemblies in FIGS. 12D-12G, removing at least one cover from side plenums 1540 provides access to 12 inches of working space for routing optical fibers, bundles, and cables. Additionally, removing respective covers of side plenums 1540 and arm plenums 1529 further enhances access and ease routing and maintaining optical cable bundles or fibers. First plenum 1226 and second plenum pivot 1236 can share substantially the same construction and hereinafter referred to as plenum pivot 1246. In the same way, first side plenum 1228 and second side plenum 1238 are hereinafter referred to side plenum 1240.

FIG. 16A illustrates an example first configuration of optical connectors in wide-knuckle housings in accordance with embodiments of the technology disclosed herein. In a first example configuration knuckle housings 1624, 1634 can each be configured with an optical connector array 1625, 1635. First knuckle housing 1624 "fist-bumps" with second knuckle housing 1634 to mate respective optical connector arrays 1625, 1635 to form a mated knuckle housing 1668. Mated knuckle housing 1668 corresponds to an all-to-all connection (i.e., solid line) illustrated in the top right portion of FIG. 16D. Here, optical fibers are routed from side plenum 1640 to first optical connector array 1625 within first knuckle housing 1624 via arm plenum 1629. The all-to-all connection path continues to second optical connector array 1634 within second knuckle housing 1634 forming the all-to-all connection between adjacent enclosures.

FIG. 16B illustrates an example second configuration of optical connectors in wide-knuckle housings in accordance with embodiments of the technology disclosed herein. In a second example configuration, knuckle housings 1624', 1634' are each configured with two optical connector arrays 1625', 1635'. First knuckle housing 1624' "fist-bumps" with second knuckle housing 1634' to mate respective optical connector arrays 1625', 1635' to establish mated knuckle housing 1668'. Mated knuckle housing 1668' corresponds to two all-to-all connections (i.e., solid lines) illustrated in top left portion of FIG. 16D. Here, optical fibers are routed from side plenum 1640 to first optical connector array 1625' within first knuckle housing 1624' via arm plenum 1629. The all-to-all connection paths continue to second optical connector array 1634 within second knuckle housing 1634 forming the two all-to-all connections between adjacent enclosures.

FIG. 16C illustrates an example third configuration of optical connectors in wide-knuckle housings in accordance with embodiments of the technology disclosed herein. In a third example configuration, knuckle housings 1624", 1634" are each configured with three optical connector arrays 1625", 1635". First knuckle housing 1624" "fist-bumps" with second knuckle housing 1634" to mate respective optical connector arrays 1625", 1635" to produce mated knuckle housing 1668". Mated knuckle housing 1668" corresponds to three all-to-all connections (i.e., solid lines) illustrated in middle left portion of FIG. 16D. Here, optical fibers are routed from side plenum 1640 to first optical connector array 1625" within first knuckle housing 1624" via arm plenum 1629. The all-to-all connection paths continue to second optical connector array 1634" within second knuckle housing 1634 forming the three all-to-all connections between adjacent enclosures.

Each optical connector array may each comprise a reconfigurable optical ferrule carrier 850, 860 (See FIG. 8) containing a plurality of optical ferrules. Additionally, the optical connectors can be installed for pre-defined in-line or orthogonal connectivity configuration. Moreover, the number of optical connectors in the connector arrays within mated knuckle housings 1668, 1668', 1668" may vary depending on the application needs. As discussed above, the width of wide-knuckle housing embodiments provides greater flexibility when designing the fiber topology and associated number of optical connections between enclosures within a rack. Additionally, the optical connector can comprise a plurality of optical ferrules within an optical connector array and associated optical ferrule carriers. Further, increasing a first number of optical connector arrays increases a second number of optical connectors within each knuckle housing. As a non-limiting example, a preexisting optical connector array configuration can be increased from one optical connector array to a modified optical connector array configuration of three optical connector arrays. Here, the first number is one optical connector array and increased by two. Thus, if a second number of preexisting optical connector configuration is also one, a modified optical connector configuration can be three optical connectors. Additionally, engagement between modified optical connector configurations in the knuckle housing of a first articulating arm assembly and the knuckle housing of a second articulating arm assembly provides a formed optical connection comprising connection paths proportional to the second number of optical connectors with each knuckle housing. In this example, three optical connectors in each knuckle housing that are engaged may form three or more connection paths.

FIG. 16D shows example connection paths of the different configurations of optical connectors in wide-knuckle housings illustrated in FIGS. 16A-16C. In FIG. 16D, each mated knuckle housing 1668, 1668', 1668" provides a dedicated number of connected paths between enclosures depending on the number of mated optical connector arrays within first 1624, 1624', 1624" and second knuckle housings 1634, 1634', 1634". As a non-limiting example, the solid lines provide example all-to-all connected paths among the enclosures while the dotted lines indicate additional connected paths (e.g., memory modules, accelerator modules that may be needed for additional bandwidth paths). As shown, all-to-all connections are formed between the four enclosures or cascaded and the number of connected paths correspond to the number of connected optical arrays. As such, a greater number of optical connector arrays with each knuckle housing can provide a greater number of connected paths. Additionally, in this way, customizable fiber topologies can be enabled depending on the needs of desired applications. Depending on the needs of an application, other types of connected paths may also be formed between mated knuckle housings. Thus, the plasticity of the optical connection system provided in this disclosure provides a dynamic optical communication environment improving the performance and serviceability of existing optical systems. Moreover, embodiments in accordance with the technology disclosed herein enhance access to enclosures and components within enclosures while avoiding disruptions to optical connections via modular articulating arm assemblies.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A modular connector comprising:
   a side plenum, an arm plenum, and a knuckle housing, wherein the arm plenum interconnects the side plenum and the knuckle housing;
   the side plenum comprising a first side and a second side, the first side interchangeably coupled to a first enclosure of a rack and the second side coupled to the arm plenum;
   the arm plenum pivotally coupled to the second side of the side plenum such that the arm plenum is rotatable about an axis extending parallel to the second side of the side plenum, and comprising a connector end coupled to the knuckle housing; and
   the knuckle housing comprising a first side and a second side, the first side coupled to the connector end of the arm plenum, and the second side comprising an optical connector;
   wherein the knuckle housing is configured to translate away from the connector end of the arm plenum to form an optical connection between the first enclosure of the rack and a second enclosure of the rack.

2. The system of claim 1, further comprising:
   a plenum pivot between the second side of the side plenum and the arm plenum, wherein rotation of the arm plenum at the plenum pivot moves the arm plenum and corresponding knuckle housing from a first position to a second position different from the first position;
   wherein when the arm plenum and corresponding knuckle housing are in the first position, the modular connector is unaligned with another modular connector associated with the second enclosure adjacent the first enclosure; and
   wherein when the arm plenum and corresponding knuckle housing are in the second position, the modular connector is aligned with the another modular connector associated with the second enclosure adjacent the first enclosure.

3. The system of claim 2, wherein the at least one knuckle housing is configured to be translatable along an axis parallel to the rotatable axis of the arm plenum and translation of the at least one knuckle housing engages the optical connector with a complementary optical connector of the second enclosure.

4. The system of claim 3, wherein the at least one knuckle housing is further configured to be rotatable relative to the arm plenum and rotation of the at least one knuckle housing changes an orientation of the optical connector.

5. The system of claim 1, further comprising:
a second side plenum, a second arm plenum, and a second knuckle housing, wherein the second arm plenum interconnects the second side plenum and the second knuckle housing and the second side plenum is coupled to the second enclosure, and
wherein the second knuckle housing is configured to mate with the translated knuckle housing of the first enclosure to form the optical connection between the first enclosure of the rack and the second enclosure of the rack.

6. The system of claim 5, wherein the second knuckle housing further comprises at least one optical connector that is complementary to the optical connector of the translated knuckle housing.

7. The system of claim 5, wherein the second arm plenum is pivotally coupled to the side plenum at a second plenum pivot and the second knuckle housing is configured to be static during translation of the translated knuckle housing of the first enclosure.

8. The system of claim 5, wherein the optical connector of the knuckle housing is further configured to be movable between a parallel orientation and an orthogonal orientation, wherein rotation of the knuckle housing changes the orientation of the optical connector between the parallel and the orthogonal orientations.

9. The system of claim 5, wherein the second knuckle housing further comprises an optical connector that is complementary to the optical connector of the knuckle housing, wherein when an orientation of the optical connector of the second knuckle housing matches the orientation of the knuckle housing, an in-line optical connection is formed, and wherein when an orientation of the optical connector of the second knuckle housing does not match the orientation of the knuckle housing, an orthogonal optical connection is formed.

10. A system for intra-rack connectivity comprising:
a plurality of enclosures in a rack, the plurality of enclosures comprising articulating arm assemblies, wherein the articulating arm assemblies comprise a plurality of side plenums, a plurality of arm plenums, and a plurality of knuckle housings;
wherein each side plenum comprises a first side and a second side, the first side interchangeably coupled to the rack and the second side coupled to an arm plenum;
each arm plenum pivotally coupled to the second side of the side plenum such that the arm plenum is rotatable about an axis extending parallel to the second side of the side plenum, and comprising a connector end coupled to the knuckle housing;
wherein each knuckle housing comprises a first side and a second side, the first side coupled to the arm plenum and the second side coupled to an optical connector; and
wherein in response to rotation arm plenums corresponding to a first articulating arm assembly and a second articulating arm assembly, respectively, the first articulating arm assembly is configured to align with the second articulating arm assembly, the first articulating arm assembly being further configured to engage second articulating arm assembly to form an optical connection.

11. The system of claim 10, wherein the optical connector comprises a plurality of optical ferrules within an optical connector array and at least one optical ferrule carrier, wherein increasing a first number of the optical connector arrays increases a second number of optical connectors within each knuckle housing; and
when the second number of optical connectors in the first articulating arm assembly engage with the second number of optical connectors in the second articulating arm assembly, the formed optical connection comprises connection paths proportional to the second number of optical connectors with each knuckle housing.

12. The system of claim 10, further comprising:
each articulating arm assembly comprising a plenum pivot between the second side of the side plenum and the arm plenum;
the arm plenum pivotally coupled to the second side of the side plenum such that the arm plenum is rotatable about an axis extending parallel to the second side of the side plenum, wherein the axis comprises the plenum pivot; and
rotation of the arm plenum at the plenum pivot moves the arm plenum and coupled knuckle housing from a first position to a second position, the first position comprising an arm plenum distal to an associated enclosure and the second position comprising an arm plenum proximal to an associated enclosure.

13. The system of claim 12, wherein a knuckle housing corresponding to the first articulating arm assembly is movable in a vertical direction from the second position to a third position to engage a knuckle housing corresponding to the second articulating arm assembly when the first articulating arm assembly and the second articulating arm assembly are aligned.

14. The system of claim 12, wherein each articulating arm assembly is configured to be in an open position when an associated side plenum is coplanar with the arm plenum and in the closed position the associated side plenum is not coplanar with the arm plenum; and
the first articulating arm assembly and the second articulating arm assembly are aligned when both articulating arm assemblies are in the open position or the closed position.

15. The system of claim 13, wherein the second arm plenum is pivotally coupled to the side plenum at a second plenum pivot and the second knuckle housing is configured to be static during the movement of the first articulating arm assembly in the vertical direction.

16. The system of claim 10, wherein each articulating arm assembly comprises a first removable cover, a second removable cover, a third removable cover, and a fourth removable cover, the first and second removable cover attached to a front and a back surface of each arm plenum and the third and fourth removable cover attached to a front and a back surface of each side plenum.

17. The system of claim 16, wherein when each cover of the side plenums are removed, each side plenum is configured to provide approximately 12 inches of space to route at least one of a plurality of optical fibers, a plurality of optical cables, and an optical fiber shuffle to each knuckle housing.

18. The system of claim 17, wherein the side plenum further comprises:
a side plenum extension disposed between the plenum pivot and the side plenum, wherein the side plenum extension is configured to increase a radius of curvature of the arm plenum during rotation of the arm plenum about the axis extending parallel to the second side of the side plenum.

19. The system of claim 11, wherein connection paths between the plurality of enclosures comprises all-to-all connected paths, some-to-some connected paths, and at least one additional connection path for accelerator modules and memory modules.

20. The system of claim 10, wherein the plurality of enclosures are cascadingly connected when articulating arm assemblies corresponding to adjacent enclosures are engaged.

\* \* \* \* \*